(12) United States Patent
Palekar et al.

(10) Patent No.: US 7,917,758 B2
(45) Date of Patent: Mar. 29, 2011

(54) TLS TUNNELING

(75) Inventors: Ashwin Palekar, Sammamish, WA (US); Arun Ayyagari, Seattle, WA (US); Daniel R. Simon, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 600 days.

(21) Appl. No.: 11/685,075

(22) Filed: Mar. 12, 2007

(65) Prior Publication Data

US 2007/0157027 A1 Jul. 5, 2007

Related U.S. Application Data

(63) Continuation of application No. 10/157,806, filed on May 30, 2002, now Pat. No. 7,529,933.

(51) Int. Cl.
*H04L 9/32* (2006.01)
*G06F 15/16* (2006.01)

(52) U.S. Cl. .......................... 713/171; 709/227
(58) Field of Classification Search ................ 713/168, 713/152; 726/2; 709/227
See application file for complete search history.

(56) References Cited

U.S. PATENT DOCUMENTS

| | | | | |
|---|---|---|---|---|
| 7,069,433 B1 * | 6/2006 | Henry et al. | .............. | 713/151 |
| 7,152,160 B2 * | 12/2006 | Lantto et al. | .............. | 713/168 |
| 7,181,530 B1 * | 2/2007 | Halasz et al. | .............. | 709/238 |
| 7,257,836 B1 * | 8/2007 | Moore et al. | .............. | 726/5 |
| 7,350,076 B1 * | 3/2008 | Young et al. | .............. | 713/169 |
| 2003/0095663 A1 * | 5/2003 | Nelson et al. | .............. | 380/270 |
| 2003/0152235 A1 * | 8/2003 | Cohen et al. | .............. | 380/278 |
| 2003/0204724 A1 * | 10/2003 | Ayyagari et al. | .............. | 713/168 |
| 2003/0212800 A1 * | 11/2003 | Jones et al. | .............. | 709/228 |
| 2006/0052085 A1 * | 3/2006 | Rodriguez et al. | .............. | 455/411 |

OTHER PUBLICATIONS

Arun Ayyagari and Tom Fout Making IEEE 802.11 Networks Enterprise-Ready, Microsoft Corporation Published: May 2001, pp. 1-49.*

* cited by examiner

*Primary Examiner* — Techane J Gergiso
(74) *Attorney, Agent, or Firm* — Merchant & Gould P.C.

(57) ABSTRACT

An authentication protocol can be used to establish a secure method of communication between two devices on a network. Once established, the secure communication can be used to authenticate a client through various authentication methods, providing security in environments where intermediate devices cannot be trusted, such as wireless networks, or foreign network access points. Additionally, the caching of session keys and other relevant information can enable the two securely communicating endpoints to quickly resume their communication despite interruptions, such as when one endpoint changes the access point through which it is connected to the network. Also, the secure communication between the two devices can enable users to roam off of their home network, providing a mechanism by which access through foreign networks can be granted, while allowing the foreign network to monitor and control the use of its bandwidth.

16 Claims, 15 Drawing Sheets

TLS TUNNELING

CROSS-REFERENCE TO RELATED APPLICATIONS

This application is a continuation of prior U.S. patent application Ser. No. 10/157,806 entitled "TLS TUNNELING," filed May 30, 2002, which is hereby incorporated by reference in its entirety as if set forth herein in full.

TECHNICAL FIELD

This invention relates generally to network security and, more particularly, relates to protecting authentication communications in a wireless network.

BACKGROUND OF THE INVENTION

Due to the increasing presence of wireless networking hardware, and the increasing throughput of wireless network communication, the number of users relying on wireless network connections continues to grow at a rapid pace. In addition, because of the need to remain connected to corporate intranets, or the Internet, while traveling users are increasingly relying on foreign hosts to act as gateways to the users' intended networks. However, each of these trends increases the risks that the users' sensitive information can be accessed by rouge third parties. Wireless communications are easily intercepted by anyone with wireless hardware within range of the wireless signals. Additionally, the foreign network host may be unknown to the user and, therefore, cannot be trusted with sensitive information.

In general, network communication relies on various protocols to enable the transport information between network hardware. One such common protocol is the Point-to-Point Protocol (PPP). PPP encapsulates datagrams from higher level protocols into a packet having a protocol field, an information field, and a padding field that can be optionally used to increase the packet size to that of the maximum receive unit (MRU) for the network. PPP also defines a Link Control Protocol (LCP) for establishing, configuring, and testing the PPP connection. An LCP packet has a protocol field with a value set to the ASCII number "c021" to indicate that it is an LCP packet. The information field contains the necessary information to perform the functions of LCP. Generally, there are three classes of LCP: link configuration packets, which can be used to establish and configure a link, link termination packets, which are used to terminate a link, and link maintenance packets, which can be used to manage and debug a link. LCP's link configuration packets can be used to configure a particular type of authentication mechanism to provide some level of security between the two communicating endpoints.

Authentication can be "one-way", in which one endpoint authenticates itself to the other end point, or it can be "two-way", in which both endpoint authenticate themselves to each other. Authentication generally relies on a shared secret that each of the two legitimate endpoints know, but which a rogue third party does not know. An endpoint has authenticated itself when it proves, to the satisfaction of the other endpoint, that it knows the shared secret, and is, therefore, legitimate. Once authentication is complete the two endpoints have proven their identities to one another and can then implement whatever security has been agreed to so as to protect the transmission of all subsequent communications.

Authentication mechanisms attempt to avoid transmission of the shared secret itself because authentication generally occurs prior to the agreement, by the two endpoints, upon a common encryption protocol with which to protect their communication. Thus, many authentication mechanisms are said to take place "in the clear" because the information exchanged during the authentication phase is not encrypted prior to its transmission. As a result, authentication mechanisms rely on one-way hashes or similar methods to prove knowledge of the shared secret, without transmitting information from which the shared secret can be reverse engineered. For example, both endpoints can apply the same one-way hash to the shared secret, such as a user-selected password. Each endpoint will derive the same value as a result of the one-way hash; a value from which the password cannot be reverse engineered. When one endpoint transmits the value to the other, the receiving endpoint can compare this received to the value it calculated to verify that they match. If the two values are the same, the transmitting endpoint has proven its knowledge of the shared secret and is, therefore, authenticated.

PPP provides for a number of authentication mechanisms, including the Challenge Handshake Authentication Protocol (CHAP) and MS-CHAP. In addition, an Extensible Authentication Protocol (EAP) has been developed for providing a mechanism by which the authentication protocol to be used can be negotiated by the two endpoints. EAP can be initially negotiated between the two endpoints using LCP. Once EAP has been negotiated, the two endpoints can use EAP to negotiate a particular authentication protocol, such as CHAP or MS-CHAP. EAP allows two endpoints to agree on an authentication protocol even if intermediate network points do not understand the selected protocol. These intermediate points can merely act as a pass-through of EAP packets and do not impact the selection of an authentication protocol.

However, most authentication protocols, including various versions of the CHAP mechanism, and EAP itself, transmit certain information "in the clear" without the security of a one-way hash or similar mechanism. For example, the user's name or identification is generally transmitted without using a hash or similar mechanism. If the user's name or identity is intercepted, the user's anonymity can be compromised. Additionally, despite the fact that the value derived by applying a one-way hash to the shared secret will not allow a rogue interceptor to reverse engineer the shared secret, the shared secret can be determined through an off-line dictionary attack. Because most users choose an English word or name as their password, a rogue interceptor need only attempt several thousand English words or names as opposed to all of the hundreds of thousands of possible combinations of characters. Using such an off-line dictionary attack, the rogue interceptor uses the same one-way hash as the two endpoints and hashes every word in the dictionary until finding a word whose hashed value is equivalent to the transmitted hashed value that was intercepted. In such a manner a rogue interceptor can obtain a user's password.

SUMMARY OF THE INVENTION

The Transport Layer Security (TLS) protocol provides a mechanism for encrypting the messages between two endpoints such that a rogue interceptor cannot eavesdrop, intercept, or tamper with the messages. Messages protected with the TLS protocol are said to be transmitted through a TLS "tunnel" that protects the messages en route from rogue interceptors. Such a TLS tunnel can be used to protect the transmission of authentication messages between two endpoints by initially setting up the TLS tunnel and postponing authentication until after the TLS tunnel has been created. Because the hashed shared secret, and the user's identity are now sent within the TLS tunnel, they are less susceptible to interception, even across links that may not be secure, such as wireless connections, or connections through access points that are not trusted.

To avoid the transmission of the user's identity in the clear and protect the user's anonymity, the initial activation of the TLS tunnel can require only general information about the user, or an alias, rather than the user's identity. While a user's email address is generally used to provide the user's identity, it may be sufficient for only the company name from the user's email address to be used, allowing the access point to direct the negotiation of the TLS tunnel to the appropriate server. Once the TLS tunnel is set up between the user's computer and the appropriate server, the user's full email address can be transmitted, protecting it from interception and maintaining the user's privacy and anonymity.

Additionally, because the use of a TLS tunnel may be most desirable in a wireless networking context, a fast reconnect mechanism can be provided to allow wireless connections to be quickly resumed and to avoid service disruptions each time the mobile user connects to a different wireless access point. A server endpoint can cache information about recently enabled connection, such as the cryptographic keys generated by the authentication and the user's identification. When the user seeks to reactivate the connection, such as through another wireless access point when the user is roaming, the server and user need only exchange an identifier of the previous session. Once received, all subsequent communication can be encrypted using the stored keys. Such a mechanism maintains security because, while the session identifier can be spoofed, the subsequent communication will be meaningless to any but the proper user, since only they will have access to the necessary encryption keys.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
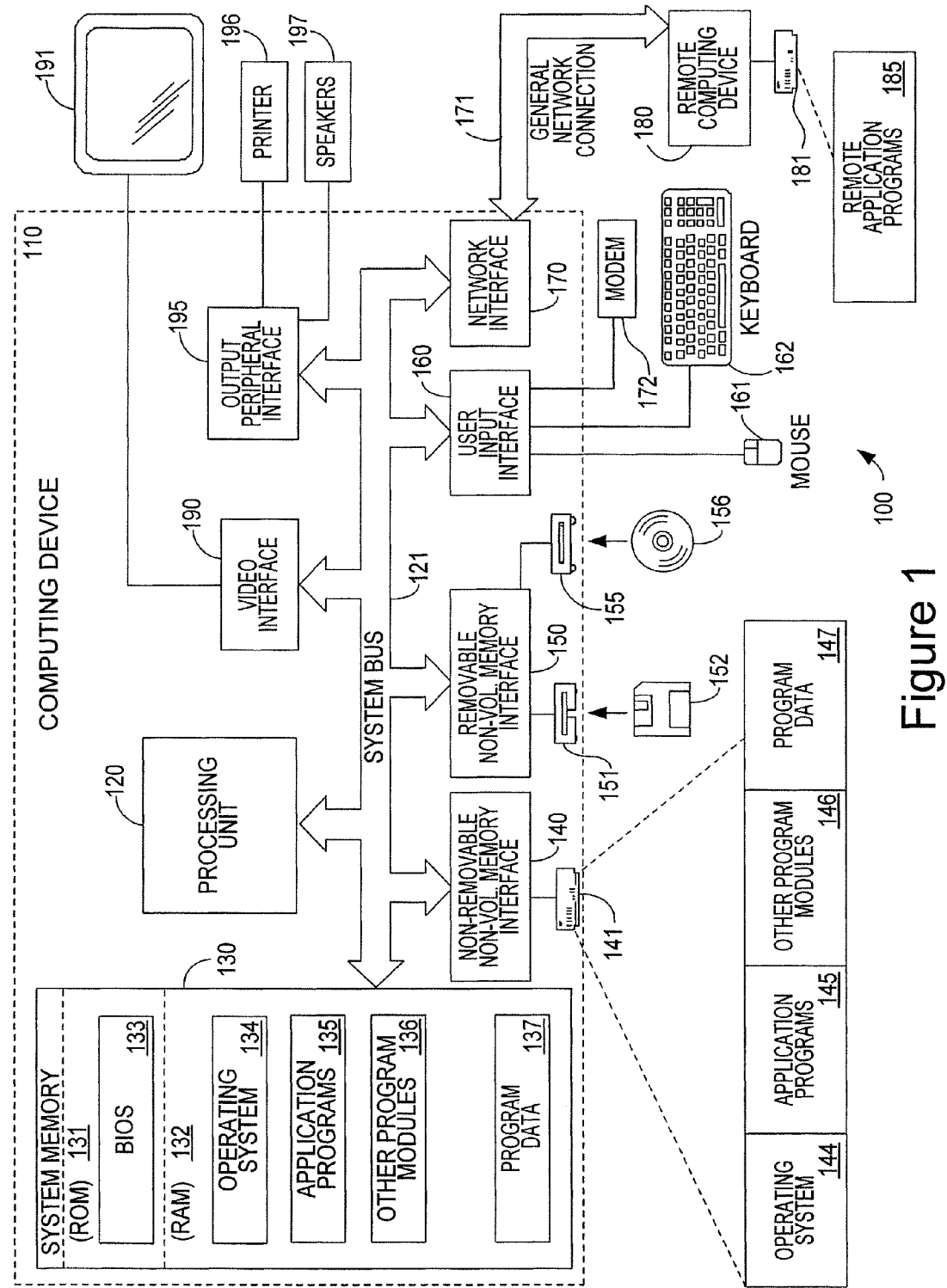
FIG. 1 is a block diagram generally illustrating an exemplary computer system on which the present invention resides.

The Transport Layer Security (TLS) protocol can be used to establish a secure method of communication between two devices on a network. Once established, the secure communication can be used by various authentication methods, providing security in environments where intermediate devices cannot be trusted, such as wireless networks, or foreign network access points. Additionally, the caching of session keys and other relevant information can enable the two securely communicating endpoints to quickly resume their communication despite interruptions, such as when one endpoint changes the access point through which it is connected to the network. Also, the secure communication between the two devices can enable users to roam off of their home network, providing a mechanism by which access through foreign networks can be granted, while allowing the foreign network to monitor and control the use of its bandwidth.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Headings may be used to provide organization only and are not meant to provide any limitation on the disclosures contained in the labeled subsections. Similarly, the headings are not meant to limit disclosure of various topics to specific subsections. The detailed description of the invention is meant and intended to be read and understood as a whole.

Computing Environment

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing devices, systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computing device. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computing device 110. Components of computing device 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computing device 110 typically includes a variety of computer readable media. Computer readable media can be any available media that can be accessed by computing device 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computing device 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD, a DVD or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing device 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computing device 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computing device 110 may operate in a networked environment using logical connections to one or more remote computers, such as a remote computing device 180. The remote computing device 180 may be another personal computer, a server, a router, a network PC, a peer device or other common network node, and typically includes many or all of the elements described above relative to the personal computing device 110, although only a memory storage device 181 has been illustrated in FIG. 1. The logical connection depicted in FIG. 1 is a general network connection 171, that is meant to include network connections such as a local area network connection, a wireless network connection, a wide area network connection, or indirect network connections, including roaming connections and foreign access point connections. The general network connection 171 is not meant to be limited to an uninterrupted network connection, and can include connections through various networking devices, such as network hubs, routers, and the like, and other computing devices, including access point providers, domain name servers, and various network hosts.

When used in a networking environment, the computing device 110 is connected to the general network connection 171 through a network interface or adapter 170. In a networked environment, program modules depicted relative to the computing device 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data.

Additionally, in the description that follows, the invention will be described in terms of client computing devices, or clients, and server computing devices, or servers. Such terms are meant only to provide convenient nomenclature for referring to various communicating computing devices, and are not meant to limit the hardware or computing device that can perform the operations described. For example, each of the communications described as taking place between a client and a server can equally take place between two computing devices of the same type. While such communication is sometimes referred to as "peer-to-peer" communication, the foregoing description will retain the terms client and server only to provide ease of reference. As will be understood by those skilled in the art, each of the communications described can be implemented in the above mentioned peer-to-peer environment, or any other communication connection between two computing devices. While the invention is being described in the foregoing context, it is not meant to be limiting as those of skill in the art will appreciate that various of the acts and operation described hereinafter may also be implemented in hardware.

Overview

In accordance with the invention, two computing devices in communication through a network connection can negotiate a TLS tunnel through which they can communicate authentication messages without fear of interception or other security breaches. The Point-to-Point Protocol (PPP) provides one mechanism for encapsulating and transporting multi-protocol datagrams over a network connection. The Link Control Protocol (LCP) provides a mechanism for establishing, configuring, maintaining, and terminating a network connection using PPP. As part of the configuration of the PPP connection, LCP can be used to select an authentication mechanism. The Extensible Authentication Protocol (EAP) is one possible authentication mechanism that can be agreed upon through the use of LCP. Unlike a fixed authentication protocol, EAP allows the precise authentication mechanism to be selected after the PPP link has been established through the use of LCP. One such authentication mechanism that can be agreed upon is the Transport Layer Security (TLS) Protocol. TLS is one example of an authentication protocol that provides an authentication mechanism, as well as support for negotiating an encryption mechanism and providing encryption key exchange. Once a secure connection is established, using a protocol such as TLS, the resulting communication is said to take place within a "tunnel" because any number of intermediate network computing devices can come in contact with the data stream, but only the two endpoints will have the necessary keys to decrypt the data. By setting up a tunnel, and then transmitting authentication information within the tunnel, the security of wireless users, and users roaming on foreign, untrusted networks will be increased.

Current authentication mechanisms operate through the use of a shared secret, such as a user's password. For example, a server computing device can maintain a database with the user's identity, such as an email address, and the corresponding password for that user. The password is a shared secret because both the server computing device and the user know the password. An initial step of authentication mechanisms is, therefore, the transmission of the user's identity, so that the authenticating server computing device can determine the correct password for that user. A secondary step of authentication mechanisms is proof of knowledge of the shared secret by the computing device seeking to be authenticated. Because generally no encryption mechanisms have yet been established between the two communicating endpoints, most authentication mechanisms avoid sending the shared secret itself, and instead rely on security devices such as a one-way hash. A one-way hash is a mathematical operation which derives a value given any input, such that the input provided cannot be reverse-calculated from the derived value. Alternatively, a key-hash can be used where the shared secret is the key used to hash an element of data. For example, the server computing device can send a random value to the client, and the client can key-hash the value using the client's password and return the hashed result to the server. The server can similarly key-hash the sent random value using the client's password, as stored in a database on the server, and compare the results of the client's key-hash. If the two hashes are identical, then the client has proven knowledge of the shared secret and can be authenticated, without ever transmitting the shared secret. Mutual authentication can be performed in a similar manner, except that the server computing device now seeks to be authenticated by proving its knowledge of another shared secret.

Because the communication attendant with the authentication mechanisms occurs without encryption, it is said to take place "in the clear." Generally, this may not be of great concern because, with most network connections, a rogue interceptor could only learn of the communication by physically intercepting the signals, which are often carried by network hardware contained within a secure environment, such as an office building. However, with the growth of wireless network connectivity, a rogue interceptor could eavesdrop on the authentication communication with nothing more than wireless network hardware of its own, and a physical location proximate to one of the wirelessly communicating endpoints. Similarly, with the increasing need to remain connected to a corporate intranet, or the Internet, mobile users are forced to rely on foreign access points through which to access these networks. However, the user cannot determine what intermediate computing devices may lurk between the foreign access points and the ultimate network destination the user seeks to connect to. Some of these intermediate computing devices may be rogue interceptors, seeking to eavesdrop on the authentication communication between the mobile user and the authenticating computing device guarding the network the user wishes to access.

By initially negotiating a secure tunnel, such as a TLS tunnel, between a wireless user, or a mobile user, and the authenticating computing device guarding the network the user wishes to access, the user's identification and the shared secret can be protected from rogue interceptors. When the user's computing device initially contacts the access point, whether it is a wireless access point, or a foreign wire-based access point, such as a local dial-in network in a city the user is visiting, the access point and the user's computing device agree upon a communication protocol, such as PPP. Subsequently, using a connection maintenance protocol, such as LCP, the access point and the user's computing device can agree upon an authentication protocol, such as EAP. Commonly, the authentication protocol is used to allow the user to authenticate themselves to the access point, so that the access point will grant the user access to the underlying network and bill the user appropriately. However, such a system requires that each access point have knowledge of every legitimate user's password. Often, however, various network providers can enter into reciprocal agreements, allowing each other's users network access without requiring that the users sign up with each network provider. In such a case, it is most convenient if the access points can simply forward along the user's authentication to the appropriate authenticating server, such as the authenticating server on the user's home network. By agreeing on an extensible authentication protocol, such as EAP, the access point can complete the connection maintenance, such as through additional LCP packets, and establish a connection with the user's computing device.

Once the connection between the user's computing device and the wireless access point has been established, further authentication can take place between the user's computing device and an authenticating server, with which the user's computing device now has access to because of the connection to the access point, using the agreed-upon extensible application protocol, such as EAP. The authenticating server and the user's computing device can then agree upon an exact authentication protocol, such as the TLS protocol. Initially, the user can be prompted for the user's identity, such as an email address. Because the authentication messages are sent in the clear, the user's privacy and anonymity can be compromised by sending the user's whole email address. Instead, it may be sufficient to only send enough of the user's email address, or other identifier, that allows the authenticating server to determine whether it has access to the necessary user database, or whether it will need to forward the user's authentication to a different authenticating server, in a manner to be explained in further detail below.

Once communication with an appropriate authenticating server is established, authentication, such as with the TLS protocol, can continue. The TLS protocol requires the two communicating endpoints, such as the user's computing device and the appropriate authentication server, to agree upon an encryption algorithm and generate cryptographic keys for use with that encryption algorithm. Broadly, the user's computing device can send a message known as a "client hello" message, comprising, among other things, a session identifier and a list of cryptographic algorithms and compression methods supported by the user's computing device. The authenticating server can respond with a "server hello" message comprising, among other things, a session identifier, if the client did not already provide such an identifier, a cryptographic algorithm selected from the list provided by the client, and a compression method selected from the list provided by the client. The authenticating server can also respond with a certificate designed to authenticate the server to the client. Upon receipt of the server's response, the user's computing device can return its own certificate, designed to authenticate the client to the server and complete the mutual authentication, as well as a client key exchange message, which can either send the pre-master secret, or can send parameters from which the pre-master secret can be derived. The client can also indicate that the server's authentication was successful. When the server receives the client's certificate and the client key, it can verify the certificate and, if verified, signal to the client that its authentication was successful. Once both endpoints have been authenticated, the TLS tunnel can be established by encrypting all further communication based on the agreed upon cryptographic algorithm and the session encryption and decryption keys derived from the master secret, which, in turn, was derived from the pre-master secret and from the client and server random numbers exchanged during the authentication phase.

After the TLS tunnel, or similar networking protocol, has been established, encrypting communication between the user's computing device and the authenticating server, intermediate devices, such as the access point, can no longer meaningfully observe the network communication between the two endpoints because they do not have the necessary cryptographic keys. At this point, a protocol such as EAP can be used to again negotiate an exact protocol for authenticating the user to allow the user access to the network. For example, using the encrypted communication between the user's computing device and the authenticating server, the authenticating server can send an EAP request for a particular authentication protocol, such as CHAP or MS-CHAP. If the user's computing device supports the authentication protocol specified in the EAP request, it can respond with an acknowledgement. Once the exact authentication protocol is agreed upon, the user can be prompted for their identification. Because the authentication communications are now being sent as encrypted communications, the user can safely transmit their entire user id, such as their email address. Based on this information, the user's computing device can prove knowledge of the user's password by, for example, sending a key-hash of a server-sent random value, using the password, which the authentication server can verify and thereby authenticate the user and grant the user access to the network.

Also, in accordance with the invention, certain techniques can be used to eliminate inconveniences related to wireless users, or users who are relying on foreign access points through which to access their home network. Specifically, because wireless users often physically change location while wirelessly connected to the network, it can be impractical to require the user's computing device and the wireless access point, such as a base station, to transmit all of the above described messages to set up a secure tunnel and then authenticate the user every time the user travels beyond the reach of a wireless base station and is transferred to another base station. Similarly, as mentioned above, users who are relying on foreign network access points will need to authenticate themselves with an authentication server on their home network and will need a mechanism by which the secure tunnel can be extended through the foreign access point, and possibly foreign authentication server, to the user's home authentication server.

The TLS protocol, and other similar protocols, provide for a mechanism by which the authenticating server can cache the encryption and decryption keys, the session identifier, and other pertinent information from recently terminated sessions. The present invention can take advantage of this ability to increase the speed at which the user's computing device can be re-authenticated to the network after being handed off from one wireless access point to another, and thereby decrease the interruption as perceived by the user. For example, a mobile user can be authenticated by an authentication server through a wireless access point in the manner described above. When the mobile user is then handed off to a second wireless access point, which might provide a stronger signal at the user's new location, the user's initial connection to the network would have been terminated, and the wireless access point will pass the user along to the authentication server. Rather than performing all of the steps described above, the user's computing device can, when sending the "client hello" message, include the session identifier of the previously negotiated session. The authentication server can then reference the cache and lookup the previously used cryptographic keys and other parameters for the session specified by the user's computing device. The authentication server can then respond to the user's computing device with an approval and the two can begin communicating using the previous derived cryptographic keys. If the user's computing device is, in fact, a rouge computing device, the encrypted communication will be meaningless because it will not possess the necessary decryption keys with which to decrypt the communication. Once the encrypted communication has commenced, and the tunnel exists, the user's computing device can re-authenticate itself as shown above. However, because of the ability of the server to cache the necessary information, the tunnel could be created with only a fraction of the messages necessary in the initial case, and a roaming wirelessly communicating user, for example, can maintain a secure connection with only a minimal lag introduced by the transfer between wireless access points.

Further efficiencies can be realized if both the authentication server and the user's computing device recognize a new version of an extensible authentication protocol, like EAP, except that is protected through the use of a previously agreed upon encryption scheme, such as the TLS tunnel. Such a Protected EAP (PEAP) can encapsulate the steps of the above description, providing a single mechanism for creating the tunnel and agreeing upon an extensible authentication protocol to be used within that tunnel. In such a situation, the initial steps, wherein the user's computing device and the authentication server initially agreed upon a mutual authentication protocol, such as TLS, which would set up the secure tunnel, as described above, could be replaced by an initial agreement to use a mutual authentication protocol such as PEAP. In the wireless context, if the authentication server and the user's computing device supported PEAP, when the user was disconnected from one wireless access point and reconnected to the network at another wireless access point, the authentication server could request the use of a protocol such as PEAP. The user's computing device could respond with a "client hello" message containing the session identifier of the previously negotiated session. As above, the authenticating server could lookup the necessary information in the cache and resume encrypted communication with the user's computing device. However, because PEAP would encapsulate both phases described above, the user would not be required to perform the authentication through the now established tunnel, but would, instead simply be granted network access, as will be described in further detail below.

Because the general mechanism described above comprises two phases: an initial authentication phase by which a secure tunnel is established between two endpoints that have mutually authenticated one another, and a secure authentication phase during which the user can provide authentication information without fear of rogue interceptors, the two phases can be performed by distinct authentication servers, allowing the user the ability to access their home network through foreign network access points. As described generally above, two networks may have a reciprocal agreement, allowing each other's uses to roam onto the other's network. In such a case, the foreign network will need to authenticate the user as properly belonging to a network with which that foreign network has a reciprocal agreement, and subsequently the user's own home network will need to authenticate the user to provide the user with access to the network.

Initially, the user can connect to the foreign network through a network access point, with which the user's computing device can negotiate an appropriate communication mechanism, such as PPP. As part of the setup of the communication between the user's computing device and the foreign access point, some form of mutual authentication can be negotiated. An extensible authentication protocol, such as EAP can allow the user's computing device and the foreign network access point to agree upon a mechanism for authentication, and complete the connection, while reserving the ultimate authentication for an authenticating server. Once the communication between the foreign access point and the user's computing device has been established, EAP communication can be initiated between the user's computing device and a foreign authentication server on the foreign network the user is accessing. In such a case, the foreign access point can act as a pass-through device, simply forwarding along the EAP packets to and from the appropriate foreign authentication server. As described generally above, because the authentication communication is taking place in the clear, and across a foreign network which the user does not trust, the user may seek to use less than their exact identity to perform the authentication, such as merely specifying the domain name portion of the user's email address. The information can be, nevertheless, sufficient for the foreign authentication server to authenticate the user, such as by determining that the user is a visitor from another network with which the current network maintains a reciprocal agreement, and set up an encrypted communication mechanism, such as a TLS tunnel.

Once the tunnel is in place, the foreign authentication server can forward along authentication communication, being sent in the secure tunnel, from the user's computing device to the authentication server on the user's home network. The user's computing device and the authentication server on the user's home network can subsequently agree upon an appropriate authentication protocol, without fear of a rogue interceptor in the foreign network viewing the messages. Alternatively, as will be described further below, if a unified authentication mechanism, such as PEAP is used, the secure tunnel to the foreign authentication server can contain another secure tunnel within it which protects communication from the user's computing device to the authentication server on the user's home network.

Network Environment

Figure 2:
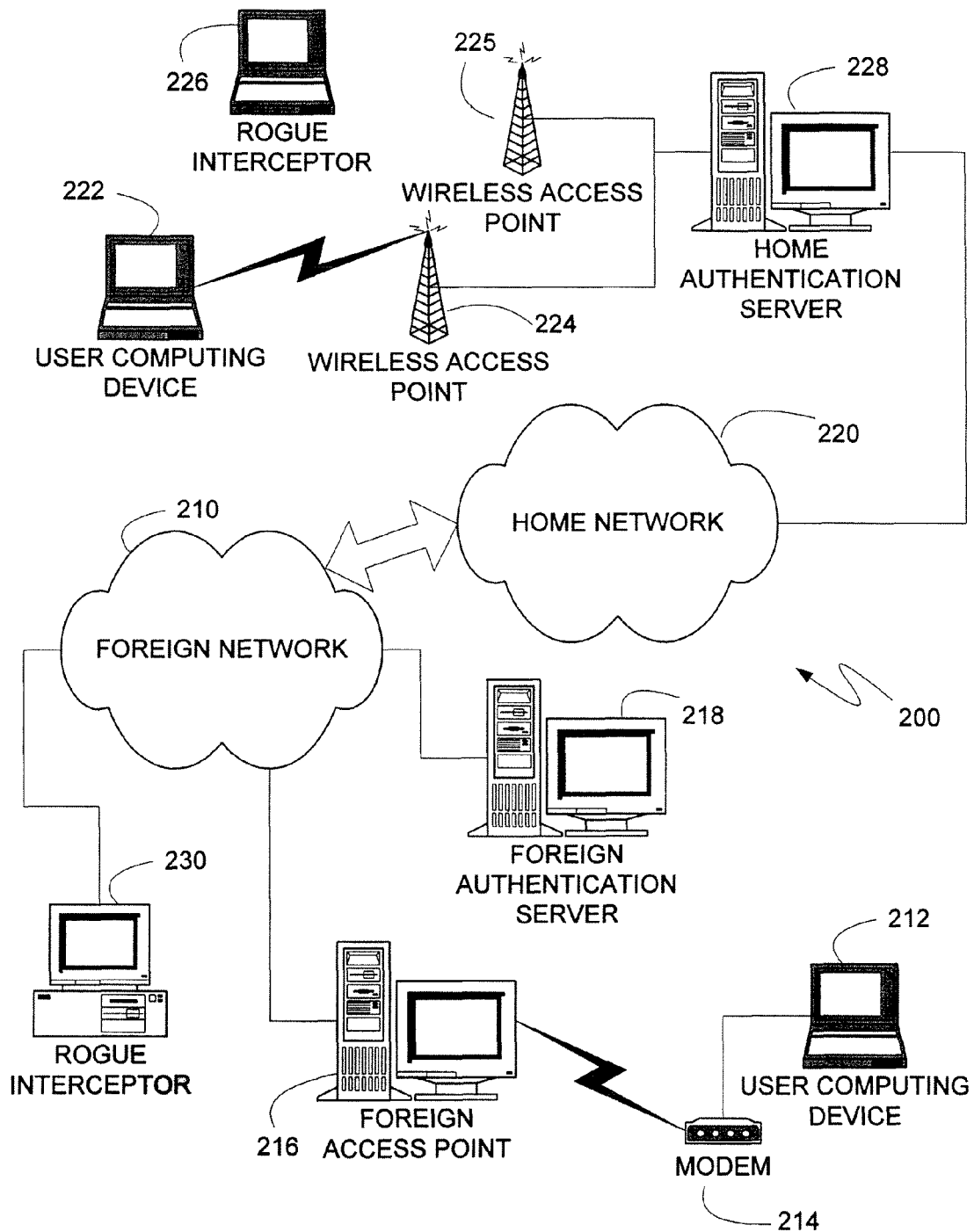
FIG. 2 is a network diagram generally illustrating a network on which the present invention can operate.

Turning to FIG. 2, a network environment 200, in which the current invention can be used, is shown. The network environment 200 comprises a user's home network 220 and a foreign network 210. Each network has a corresponding authentication server device, such as a home authentication server 228 connected to the home network 220 and a foreign authentication server 218 connected to the foreign network 210. As shown in FIG. 2, a user can access the home network 220 through a wireless access point, such as wireless access points 224 or 225, or through the foreign network 210, which, in turn, can be accessed through a foreign access point 216, which can be a dial-in server, a network router, or similar access point. A user computing device in the form of a wireless-enabled laptop computing device 222 is shown communicating to the wireless access point 224. Additionally, a user computing device in the form of a modem-enabled laptop computing device 212 and a modem 214 is shown communicating to the foreign access point 216. In either case, the user can have their security and anonymity compromised by a rogue interceptor, shown in the form of a wireless rogue interceptor 226 and a wire-based connected rogue interceptor 230. While a preferred embodiment of the present invention will be described in detail with respect to the network environment 200, it is to be understood that the present invention can be implemented on a variety of network environments, including LANs, WANs, wireless networks, Token-ring networks, Ethernet networks, and the like, each of which can vary in scope, complexity, and size.

Figure 3A:
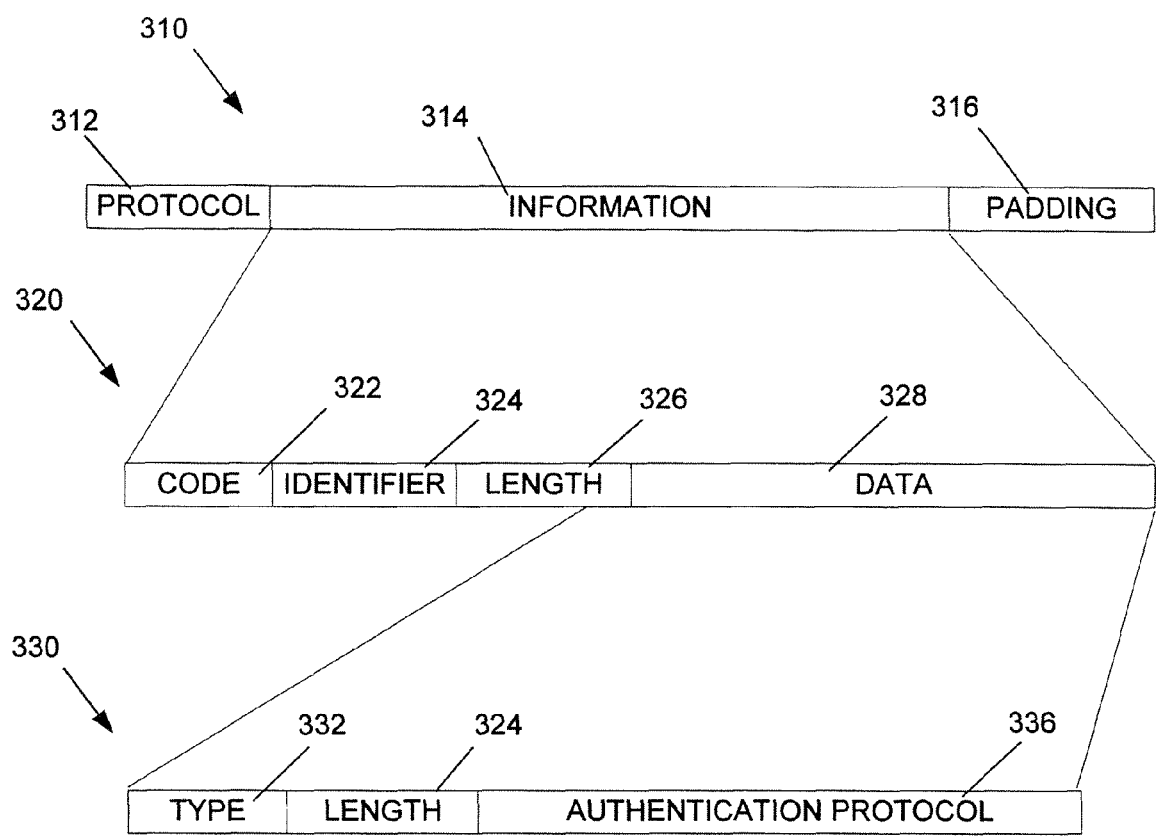
FIGS. 3a and 3b are data packet diagrams generally illustrating the format of packets that can be used by the present invention.

In a preferred embodiment of the invention, PPP is used as the underlying communication protocol, including the use of LCP to configure, negotiate, maintain, and terminate the PPP connection. The present invention is equally applicable on any other type of communication protocol, and is not intended to be limited to embodiments described in detail herein. Turning to FIG. 3a, a PPP packet 310 is shown having a protocol field 312, an information field 314, and a padding field 316. As will be known to those skilled in the art, the protocol field 312 specifies the type of PPP packet, the information field 314 carries the information necessary to the type of packet specified in the protocol field, and the padding field 316 can be optionally used to increase the size of the PPP packet 310 to the maximum transmission unit (MTU) of the network over which the PPP packet is to be sent. One type of PPP packet, specified by the ASCII value c021 in the protocol field 312, is an LCP packet 320. Contained within the information field 314 are various fields that comprise the LCP packet 320, including: the code field 322, the identification field 324, the length field 326, and the data field 328. As will also be known by those of skill in the art, the code field 322 identifies the type of LCP packet 320, the identifier field 324 aids in matching LCP replies with the request to which that reply is directed, the length field 326 specifies the length of the LCP packet, and the data field 328 contains the information necessary to the type of LCP packet specified in the code field. Further information regarding PPP and LCP can be found in the Internet Engineering Task Force paper RFC 1661 entitled "Point-to-Point Protocol" by Simpson, dated July 1994, the contents of which are hereby incorporated by reference in their entirety.

FIG. 3a also illustrates the use of LCP packet 320 to negotiate an authentication mechanism. A code field 332 value of 1 indicates a configuration-request LCP packet that can be used to suggest particular configurations to the other communicating endpoint. If the LCP packet 320 was to be used to suggest a particular authentication mechanism, the data field 328 of LCP packet can contain an authentication-protocol configuration option packet 330 as shown in FIG. 3a. The authentication packet 330 contains a type field 332, a length field 334, and an authentication protocol field 336. The type field 332 indicates the type of configuration option suggested, the length field 334 contains the length of the authentication packet 330, and the authentication protocol field 336 contains an indication of the suggested authentication mechanism. For example, an authentication protocol field 336 value of c223 indicates the Challenge Handshake Authentication Protocol (CHAP) and a value of c227 indicates the Extensible Authentication Protocol (EAP).

Figure 3B:
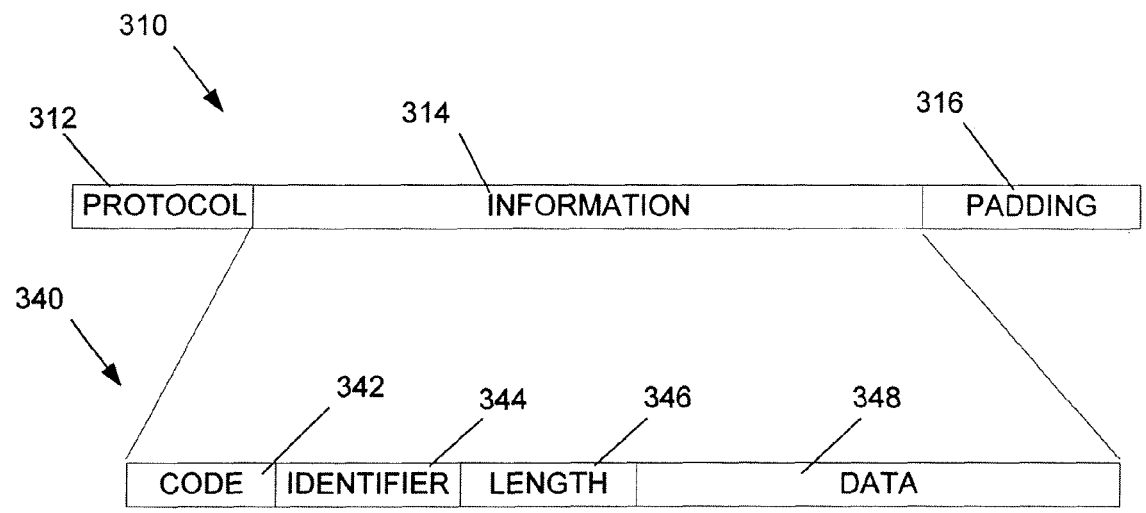

As is known by those of skill in the art, the agreement by both communicating endpoints to use EAP is not an agreement on a particular mechanism of authentication, but merely the agreement to use EAP to negotiate a particular authentication mechanism. EAP enables the communicating endpoints to complete the setup of the communication link, through the use of the LCP packets, and subsequently use EAP packets to select the particular authentication mechanism. FIG. 3b illustrates the encapsulation of an EAP packet 340 within the information field 314 of PPP packet 310. As shown, EAP packet 340 contains a code field 342 to identify the type of EAP packet, an identifier field 344 that aids in matching EAP replies with the request to which that reply is directed, a length field 346 that specifies the length of the EAP packet 340, and a data field 348 that contains the data necessary for the type of EAP packet specified by the code field. Additional information regarding EAP can be found in the Internet Engineering Task Force paper RFC 2284 entitled "PPP Extensible Authentication Protocol (EAP)" by Blunk and Vollbrecht, dated March 1998, the contents of which are hereby incorporated by reference in their entirety.

Authentication Mechanism

One authentication mechanism which can be selected through the use of EAP is the Transport Layer Security (TLS) protocol. As will be known by those skilled in the art, the TLS protocol provides for a secure method of communication between two endpoints and a mechanism for mutual authentication of the two endpoints. Broadly, the TLS protocol can be thought of as two layers: a TLS Record Protocol layer, providing symmetric cryptography for data encryption and providing message integrity using a keyed Message Authentication Code (MAC), and a TLS Handshake Protocol layer, providing connection security through authentication and secure negotiation of a shared secret. Generally, the TLS Record Protocol layer is layered on top of a reliable transport protocol, such as the Transmission Control Protocol/Internet Protocol (TCP/IP).

The TLS Record Protocol can take messages to be transmitted, fragment the data into more appropriately sized segments, optionally compress the data, apply a MAC, encrypt the result and then transmit it across the network. A TLS connection state is the operating environment for the TLS Record Protocol, and it can specify the compression, encryption, and MAC algorithms to be used, as well as the parameters for these algorithms, such as the MAC secret, and the encryption and decryption keys. Generally, four TLS connection states exist at any time: the current read and write states and the pending read and write states.

The TLS Handshake Protocol is used to allow the two communicating endpoints to agree upon the parameters and algorithms to be used by the TLS Record Protocol. Broadly, the TLS Handshake Protocol involves the following steps: (1) exchange of "hello" messages to agree on algorithms, exchange of random values, and check for session resumption, in a manner to be described further below; (2) exchange of cryptographic parameters to allow the client and server to agree upon a pre-master secret; (3) exchange of certificates and cryptographic information to allow the client and server to authenticate themselves; (4) generation of a master secret from the pre-master secret and exchanged random values; (5) provision of the parameters to the TLS Record Protocol; and (6) allowance of both communicating endpoints to verify that the other has calculated the same parameters and that the handshake occurred without tampering by a rogue interceptor.

More specifically, the TLS Handshake Protocol begins with the sending of a client hello message, offering options comprising: protocol version, session identification, cipher suite, compression method, and a random value. The server can respond with a server hello message comprising: a protocol selected from among those offered by the client, a session identifier, if the client did not provide a previously used session identifier in an attempt to resume a previous session, a selection of the cipher suite and compression method from among those offered by the client, and another random value. Following the hello messages, the server will send its certificate, if it is to be authenticated, a server hello done message, and an optional server key exchange message. The client can respond with its own certificate, if it is to be authenticated, a client key exchange message, and a change cipher specification message, which requests that the client and server implement the pending read and write states that should have just been negotiated. The server will also change to its pending read and write states and send a finished message using the negotiated encryption and compression. Because, to ensure compatibility, TLS Handshake Protocol messages begin with no encryption and compression, the change cipher specification message signals the start of the use of the encrypted TLS tunnel for transmitting data between the two communicating endpoints.

As briefly mentioned above, the TLS protocol provides a mechanism by which many of the messages sent by the TLS Handshake Protocol are avoided when a client and a server that have previously authenticated themselves and set up a secure TLS tunnel are reconnecting. The client hello message can contain a session identifier, specifying the previously established session. The server can cache information about each session, such as the encryption algorithm and keys that were agreed upon, the compression algorithm agreed upon, the corresponding session identifier, and similar information. A server can cache such information for an indefinite amount of time, though increased security can be realized by clearing the cache of all entries older than a pre-selected, relatively short, amount of time. If the client hello message contains a session identifier of a session the server has cached, and the server determines that it is safe to resume the session, the server can respond with a server hello message verifying the session identifier. Subsequently, both the client and the server can send a change cipher specification message to indicate that they will switch to the pending read and write states using the previously negotiated parameters. The client and server can then begin sending information using the cached cryptographic keys and algorithm and the encryption algorithm selected during the initial negotiation. If the client understands the communication, then, by definition, the client has the appropriate cryptographic keys and other information, and the secure connection can be quickly resumed. A rogue interceptor will not possess the necessary cryptographic keys, and the server's communication will be meaningless for the rogue interceptor. Thus, security is maintained while providing a mechanism for fast reconnections. Additional information regarding the TLS protocol can be found in the Internet Engineering Task Force paper RFC 2246 entitled "The TLS Protocol Version 1.0" by Dierks and Allen, dated January 1999, the contents of which are hereby incorporated by reference in their entirety.

Figure 4:
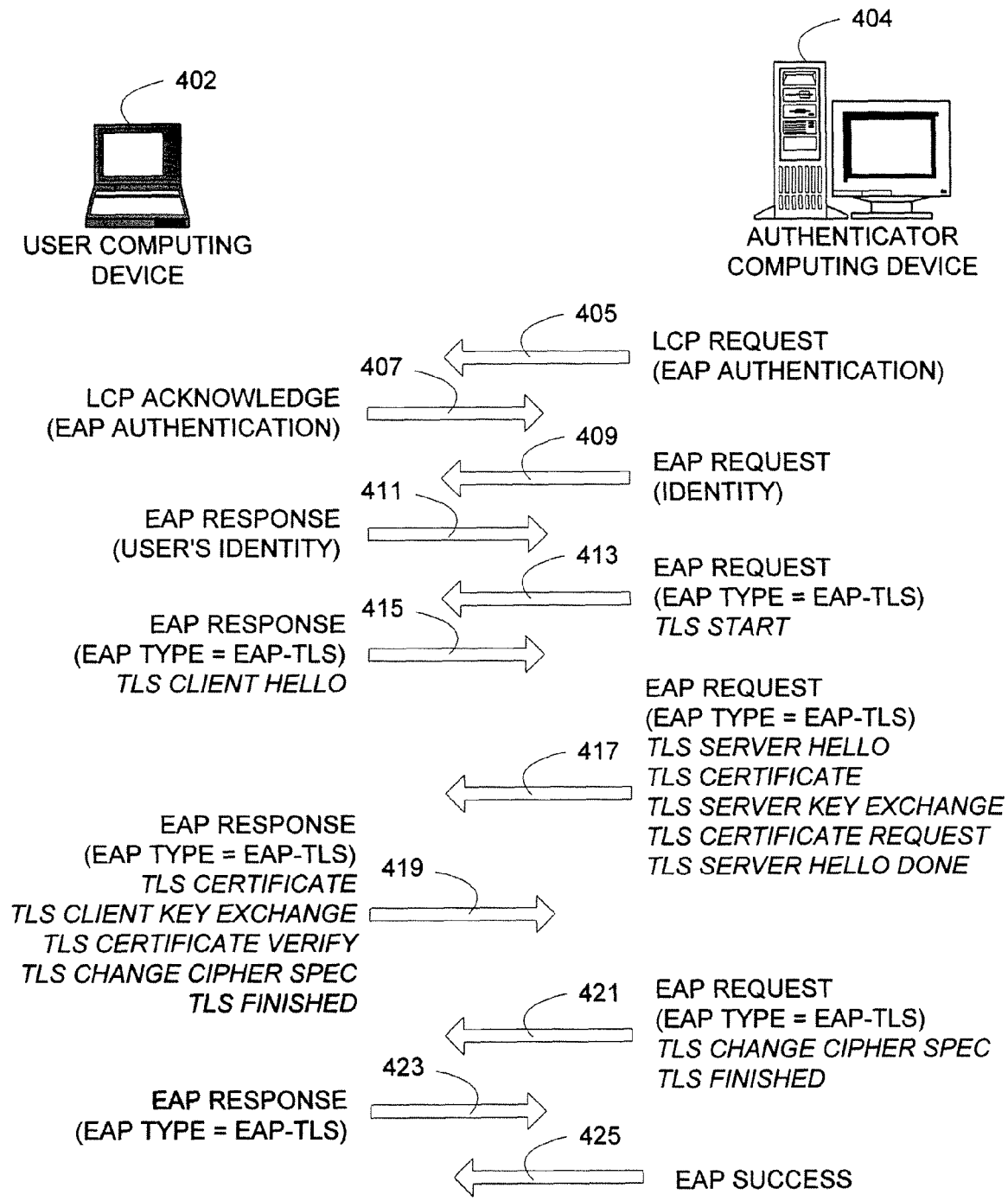
FIG. 4 is a communication flow diagram generally illustrating the flow of messages contemplated by the present invention.

One method for negotiating the use of the TLS protocol is through the use of EAP. Turning to FIG. 4, a series of communications 400 is shown between a user's computing device 402, which is the client for the illustrated communication, and an authenticator computing device 404, such as an authentication server, which acts as the authenticator for the illustrated communication. Initially, LCP packets can be used by the authenticator 404 to request the use of EAP as the authenticating protocol, as shown by message 405. An LCP acknowledgement packet 407 can be sent by the client 402, agreeing upon the use of EAP. Additional LCP packets may be sent to negotiate and set up other aspects of the connection between the client 402 and the authenticator 404 prior to the commencement of EAP communication.

EAP communication can begin with the authenticator 404 sending an EAP request packet 409 to request the client's identity. The client can respond with an EAP response packet 411 containing the client's identity, such as the email of the user, or merely the domain name of the user's email, as will be explained further below. Because the user may wish to remain anonymous until a secure TLS tunnel has been established, the user can defer transmitting a precise identity until the transmission will take place within the secure tunnel. Thus, in response to the EAP request packet 409, the user can respond with an alias, such as "guest" or "secure authentication." Such aliases can signal to the authenticator 404 that the user wishes to defer identification until secure communications have been established. If the authenticator is capable of establishing secure communications, such as those defined by the TLS protocol, it can proceed to attempt to establish such secure communications by, for example, sending an EAP request packet 413, requesting that the authentication proceed using the TLS protocol as described below.

Alternatively, the user can respond with less than the complete user identification. Many times a user's email address also serves as the user identification for purposes of authentication. In such a case, the user can respond with less than the complete email address, providing the authenticator with sufficient information to determine whether it should remote the authentication to an authenticator on the user's home network, as will be explained in more detail below, or establish the TLS tunnel itself. For example, a user's email address generally takes the form of: username@domainname.extension. In response to EAP packet 409 the user can simply respond with domainname.extension, allowing the authenticator to determine the user's home network and determine if it is the appropriate authenticator to authenticate the user. If the authenticator determines that it can establish the TLS tunnel with the client, the authenticator can use an EAP request packet to request that the authentication process use the TLS mechanism, as shown in communication 413.

As explained in detail above, the TLS Handshake Protocol generally begins negotiation of the parameters used by the TLS Record Protocol with a client hello message. Thus, in response to the EAP request 413, the client can issue a client hello message 415 encapsulated in the data field 348 of an EAP packet. The client hello can contain a listing of cryptographic and compression algorithms supported by the client, as well as the version of the protocol supported by the client and a client selected random number, as described above. In response to the client hello message 415, the authenticator can send a server response message 417 comprising a server hello, a TLS certificate, if the authenticator is to be authenticated to the client, a server key exchange, if required, a certificate request for the client, if the server wishes to require the client to authenticate itself, and a message to indicate that the server hello is completed. As explained above, the server hello can select an encryption and compression algorithm from among those offered to the client, as well as establish a session identifier for the current session, if the client was not resuming a session in the manner previously described. A TLS certificate, which allows the client to authenticate the server, can be part of the server response message 417. More specifically, the TLS certificate can reflect the selected encryption algorithm and can contain a key that matches the key exchange method connected with the selected encryption algorithm. As will be understood by those skilled in the art, multiple certificates can be chained together, where each certificate directly certifies the preceding certificate. Thus, a TLS certificate may include such a chain of certificates.

In addition, a server key exchange message can be part of the server response message 417, if the server certificate does not contain enough information to allow the client to exchange a pre-master secret. Broadly, a pre-master secret is a value that can be agreed upon or transmitted between the two communicating endpoints that seek to encrypt their communications. Subsequently, both endpoints can independently derive a master secret from the pre-master secret. From the master secret, each endpoint can independently derive a master session key, that can be used to generate a send and receive key. The send and receive keys are usually generated through the use of a one-way hash, or similar algorithm and are used to encrypt data about to be transmitted and decrypt received messages, respectively. By following such a path, corresponding send and receive keys can be generated by the two endpoints while minimizing the risk that a rogue interceptor can also obtain the necessary keys to intercept or interfere with the communications. Generally, the server key exchange message will contain information that will allow the client to encrypt the pre-master secret for transmission to the server. However, many encryption mechanisms provide methods by which the client and server can agree upon a pre-master secret using the information provided in the server certificate, as well as the random values exchanged by the client hello message 415 and the server hello portion of the response message 417. As will be known by those skilled in the art, it may be inappropriate to send a server key exchange message with some encryption mechanisms.

While the TLS mechanism provides a mechanism by which the server can send a certificate request as part of response message 417, when TLS is negotiated through the use of EAP for the purpose of establishing a secure tunnel through which a secure authentication can take place, it may be advantageous for the server to not send a certificate request, but instead establish the secure tunnel having only authenticated itself to the client. The largest security concern for wireless users, or mobile users accessing their home network through a foreign network access point, is a rogue interceptor. A rogue interceptor can mimic an authenticating server computing device, in an effort to trick the client into revealing their user name and password, or it can monitor authentication communication sent in the clear through wireless access, or network access on the foreign, and untrusted, network. A rogue interceptor can also attempt to gain access to the user's home network by seeking to trick the authenticating server computing device into granting the rogue access. However, all of these security concerns rely on the rogue interceptor gaining access to information that it can use to mimic a legitimate user, or otherwise trick the authenticating server computing device. Thus, allowing the server to send its certificates and authenticate itself to any client is an acceptable security risk, even if the client is a rogue interceptor. By using only the server's certificates to establish the secure tunnel, the client can verify that the authenticating server computing device is a legitimate authenticator, and can refrain from transmitting its authentication information in the clear and instead use the established secure tunnel.

Upon receipt of the server's response message 417, the client 402 can respond with a client finishing message 419 comprising: a client certificate, if requested by the server in message 417, a certificate verification of the client certificate, if the client certificate has signing capability, a key exchange message appropriate for the negotiated encryption algorithm, a message requesting that the cipher specification be changed to the pending read and write states, and a TLS finished message. As stated above, if the negotiation of TLS is for the purpose of establishing a secure tunnel to protect authentication communication, as will be described in greater detail below, then the server 404 should not request that the client 402 send a client certificate. In such a case the client finishing message 419 may not contain the client certificate or the certificate verification. However, if the server does request a client certificate, the client can still avoid sending its certificate in the clear by responding with a client certificate containing no certificates. Alternatively, if the client chooses, it can send a client certificate and certificate verification, if necessary, to authenticate itself to the server. The client finishing message 419 can also contain a key exchange message that communicates the pre-master secret to the server, such that the send and receive encryption keys appropriate to the negotiated encryption algorithm can be derived in the manner described above.

In addition to certificate and key exchange messages, the client finishing message 419 can also contain a request to change the encryption specification and implement the pending read and write states in the TLS Record Protocol. The message, known as a "change cipher spec" message, indicates that the pending read and write states, implementing the agreed upon encryption and compression protocols and parameters, are to be made active. The first message sent using the new read and write states is the TLS finished message, which is also part of the client finishing message 419. If the other communicating endpoint, the server 404 in this case, can understand and verify the TLS finished message, then the client 402 and the server 404 are assured that they have properly negotiated the secure TLS tunnel and can communicate in the encrypted fashion dictated by the new, agreed upon, read and write states.

To indicate that the server 404 can understand the TLS finished message contained in 419, and to verify that message, the server can send a verification message 421, comprising a change cipher spec message and a TLS finished message of its own. The change cipher spec message can indicate that the server 404 is switching to its new read and write states, and the TLS finished message can be the first message sent using the new read and write states. By sending message 421, the server 404 is indicating that the client 402 has successfully authenticated itself. To confirm that the server 404 has successfully authenticated itself to the client 402, the client can send an EAP response packet in message 423. The EAP response packet need not have any data sent with it. To confirm receipt of the EAP response packet, the server 404 can respond with an EAP success packet in message 425. The EAP authentication phase is then completed, and a secure TLS tunnel exists between the server 404 and the client 402.

Figure 5:
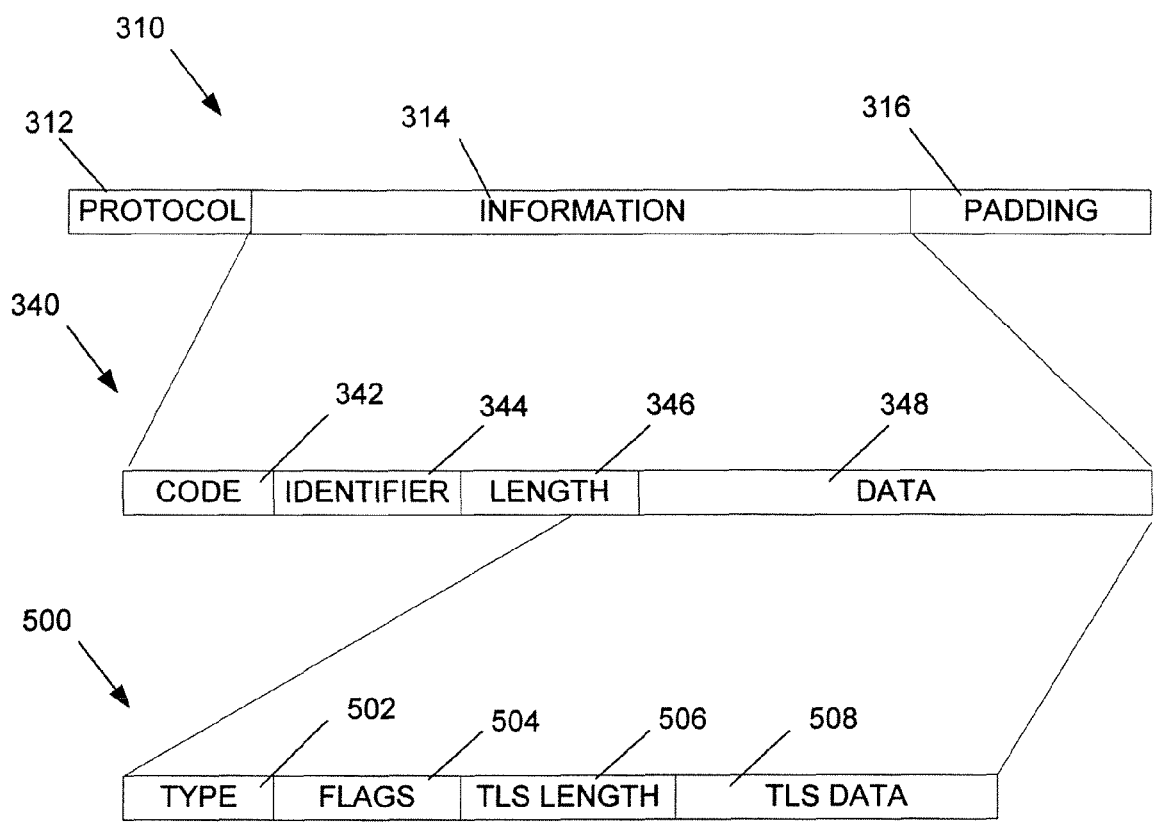
FIG. 5 is a data packet diagram generally illustrating the format of packets that can be used by the present invention.

Turning to FIG. 5, the PPP packet 310 and EAP packet 340 from FIG. 3 are shown in combination with a TLS packet 500 that can be used for the communication between the client 402 and the server 404 described above. The TLS packet 500 can be carried in the data field 348 of the EAP packet 340. As shown, the TLS packet 500 can contain a type field 502, which can specify an EAP-TLS type, a flags field 504, a TLS length field 506, providing the length of the TLS packet 500, and a TLS data field 508 that can transport the information described above, communicated between the client and the server. The flags field 504 can contain a number of flags to indicate certain conditions, such as whether the message was fragmented, the total length of the message, and whether additional fragments follow the current fragment. Additional information regarding the use of EAP to negotiate a TLS connection can be found in the Internet Engineering Task Force paper RFC 2716 entitled "PPP EAP TLS Authentication Protocol" by Aboba and Simon, dated October 1999, the contents of which are hereby incorporated by reference in their entirety.

Returning to FIG. 2, in some network environments, the access point, such as the wireless access points 224 or 225, or the foreign access point 216 can also comprise an authenticator. In those cases, the above described communication to establish a TLS tunnel between a client 402 and a server 404 can take place between a user computing device accessing the network, such as devices 212 or 222, and the respective access points 216, 224, or 225. However, as shown in the network environment 200, an authentication server computing device, such as the home authenticating server 228 or the foreign authenticating server 218, may be a separate computing device from the access points 216, 224, or 225. The communication described above, therefore, will allow the authenticating server computing devices 218 and 228 to mutually authenticate the client computing devices 212 and 222, respectively, with the access points 216, 224, or 225, respectively, acting as pass-through devices.

One protocol for handing off authentication to another computing device is known as the Remote Authentication Dial In User Service (RADIUS). RADIUS allows an access point to receive authentication communication from a user computing device, and re-encapsulate the information contained in the authentication communication into an access-request packet sent to a RADIUS server, which could be the authenticating server computing devices 218 and 228. The RADIUS server can then authenticate the user and return an access-accept, or an access-reject if the user's authentication failed, to the access point. A protocol such as the RADIUS protocol can be used to allow foreign access points to communicate with authentication server computing devices on the user's home network to grant the user access to the foreign network resources, in a manner which will be described in further detail below. Additional information regarding the RADIUS protocol can be found in the Internet Engineering Task Force paper RFC 2138 entitled "Remote Authentication Dial In User Service (RADIUS)" by Rigney, Rubens, Simpson and Willens, dated April 1997, the contents of which are hereby incorporated by reference in their entirety.

Returning to FIG. 4, the client 402 and the server 404, through the communications illustrated, generate a set of cryptographic keys for establishing the secure TLS tunnel. However, if, as illustrated in FIG. 2, the server 404, such as authentication server 218 or 228, is a separate computing device from the network access point with which the client is communicating, such as network access points 216, 224, or 225, there may exist a need for a mechanism by which the cryptographic keys generated at the server 404 are transmitted to the network access point. Once the user is authenticated, the authentication server no longer needs to communicate with the user, and the user's access of the network is granted solely through the network access point. Therefore, to maintain secure communications with the network, and protect the information being transferred between the network access point and the user's computing device, the network access point will need the cryptographic keys generated by the authentication communication described above. Additionally, it is important to note that the communications illustrated in FIG. 4 allow the client, such as client computing devices 212 and 222, to authenticate the authentication server with which they are communicating, such as authentication server computing devices 218 or 228, respectively. The access point, such as access points 216, 224, or 225, respectively, do not have their identity authenticated by the client 202, and may not be part of the authentication illustrated in FIG. 4.

Protected Authentication Mechanisms

Figure 6:
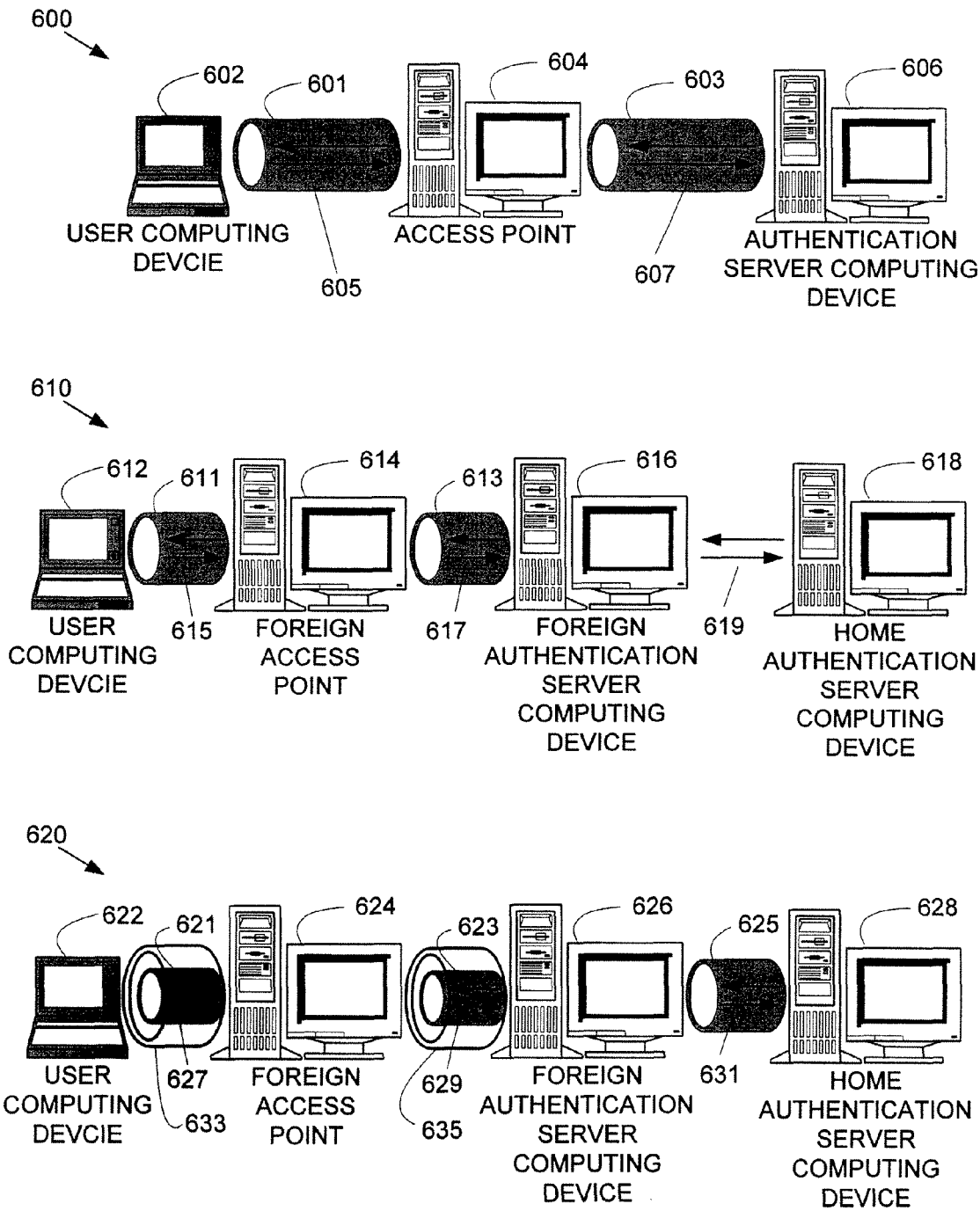
FIG. 6 is a network communication diagram generally illustrating the communications that can be established by the present invention.

Turning to FIG. 6, a representation of the authentication communications contemplated by some of the preferred embodiments of the present invention is shown. The mechanism described above is one preferred method for establishing a secure channel such as a TLS tunnel, through which more conventional authentication communication can take place securely. The authentication communications illustrated in network diagram 600 show a secure tunnel 601 and 603 extending from a client computing device 602, such as client computing devices 212 and 222 shown in FIG. 2, to an authentication server computing device 606, such as authentication server devices 218 and 228 shown in FIG. 2. Once the secure tunnel 601 and 603 is established, more conventional authentication communications can take place within the secure tunnel, as indicated by authentication communications 605 and 607. The access point 604 can initially forward along the authentication communication from the client computing device 602 to the authentication server 606 in order to establish tunnel 601 and 603. Once the tunnel is established, the access point can simply forward the encrypted packets along to the authentication server. Alternatively, the access point 604 can use a protocol such as RADIUS to authenticate the client 602 itself, with the aid of the authentication server 606. In such a case, the secure tunnel 603 would not have been established, as the authentication would have taken place between the client 602 and the access point 604, and only secure tunnel 601 between the access point and client would have resulted. The communication between the access point 604 and the authentication server 606 could be secured by the RADIUS protocol, or similar mechanism.

Figure 7:
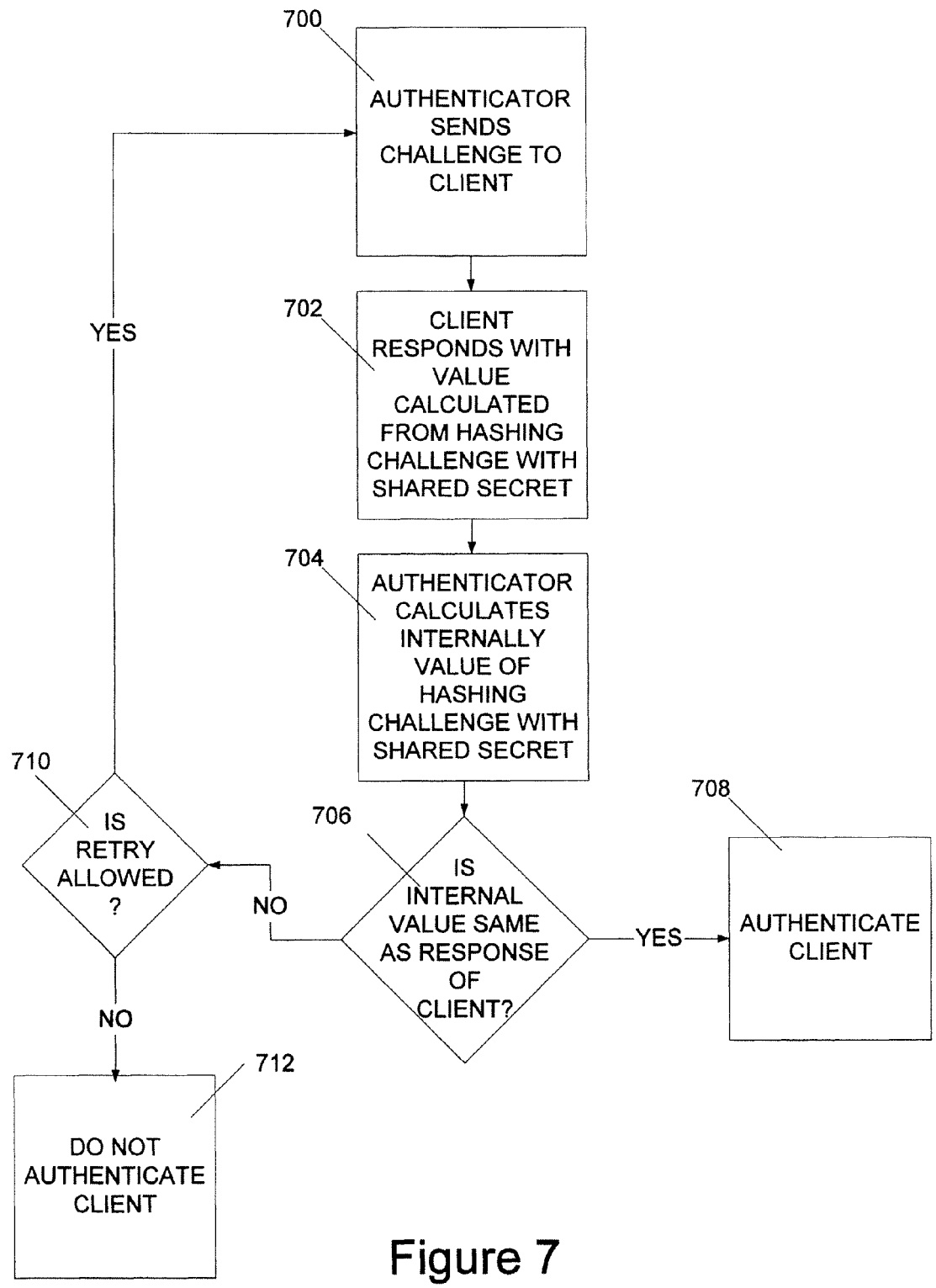
FIG. 7 is a flowchart generally illustrating an authentication mechanism that can be used by the present invention.

One example of more conventional authentication mechanisms 605 and 607, which can be used within the secure tunnel 601 and 603, is the Challenge Handshake Authentication Protocol (CHAP). Broadly, the CHAP protocol uses a three-way handshake to authenticate the client 602 to the server 606. As described above, the server 606 has already authenticated itself to the client in order to established the secure tunnel. Turning to FIG. 7, the CHAP handshake begins at step 700 when the server sends the client a random value as a "challenge." The client can respond, at step 702, with the result of a one-way hash of the challenge and a shared secret that only the client and the server would know, such as the user's password. The challenge and password are "hashed" when they are the inputs to specific mathematical functions known by those of skill in the art. Hashing the same challenge with the same password will always provide the same answer value. Thus, when the client hashes the two and returns a number at step 702, this number should be the same as that calculated internally by the authenticator, at step 704. At step 706, then, the authenticator compares the two and checks whether the value received from the client is the same as that calculated internally. If the values are the same, the client has proven that it "knows" the password, and should be authenticated at step 708. If the response from the client is different from the value calculated internally by the authenticator, then the client should not be authenticated. However, the authenticator can determine, at step 710, whether the authentication that was negotiated allows for retries, and how many. If it does allow for retries, and the maximum number of retries has not been exceeded, then the authenticator sends another challenge to the peer. If no retries are allowed, or the maximum number has been reached, the connection is ended at step 712.

Figure 8:
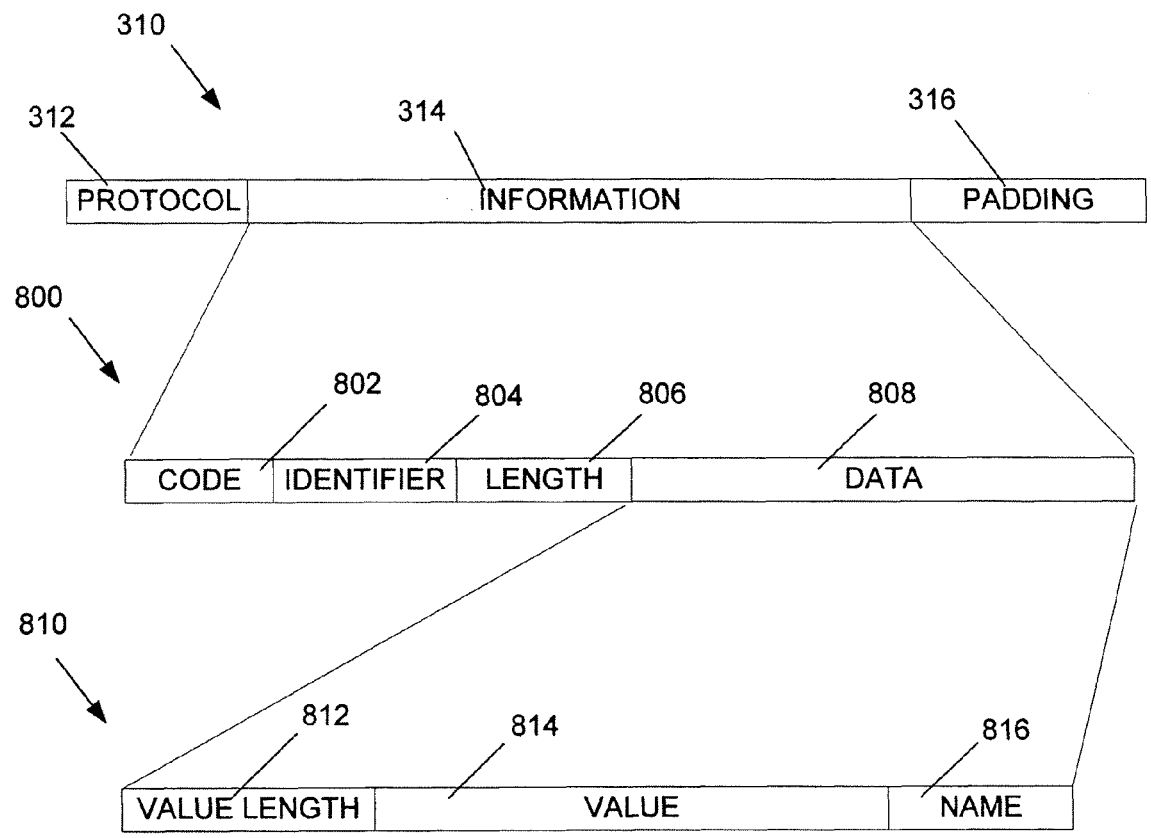
FIG. 8 is a data packet diagram generally illustrating the format of packets that can be used by the present invention.

PPP frame 310 containing a CHAP packet 800 is shown in FIG. 8. The PPP 310 frame contains the same structure as the PPP frame 310 in FIG. 3, and like fields are numbered accordingly. The CHAP packet 800 contains fields similar to those in LCP packet 320 in FIG. 3. For a CHAP packet, the code field 802 can indicate whether the CHAP packet is a challenge, response, success, failure, or other type of CHAP packet. As before, the identifier field 804 allows CHAP to determine which response packet is the response to a particular challenge packet. The length field 806 simply gives the length of the CHAP packet 800. For the challenge and response procedure described above with reference to FIG. 7, the data field 808 will contain a packet such as packet 810. The value length field 812 contains the length of the packet 810. If packet 810 is a challenge packet, value field 814 can contain the challenge; if packet 810 is a response packet, then value field 814 can contain the response. The name field 816 can contain the name of the user seeking authentication.

A similar authentication protocol to CHAP, known as MS-CHAP, provides a few modifications to the CHAP algorithm. For example, MS-CHAP defines a set of failure codes which can be returned in a message field of a "failure" packet and can provide useful information to the client in determining why authentication was unsuccessful. Additionally, MS-CHAP provides for a different formatting of the response packet, such as would be sent in step 702. Specifically, the value field 814 can contain multiple responses encoded for a variety of programs. MS-CHAP also allows the authenticator greater flexibility in selecting an appropriately secure mechanism for storing the shared secrets of its users. Additional information regarding the CHAP protocol can be found in the Internet Engineering Task Force paper RFC 1994 entitled "PPP Challenge Handshake Authentication Protocol (CHAP)" by Simpson, dated August 1996, the contents of which are hereby incorporated by reference in their entirety. Similarly, additional information regarding the MS-CHAP protocol can be found in the Internet Engineering Task Force paper RFC 2138 entitled "Microsoft PPP CHAP Extensions" by Zorn and Cobb, dated October 1998, the contents of which are hereby incorporated by reference in their entirety.

Figure 9:
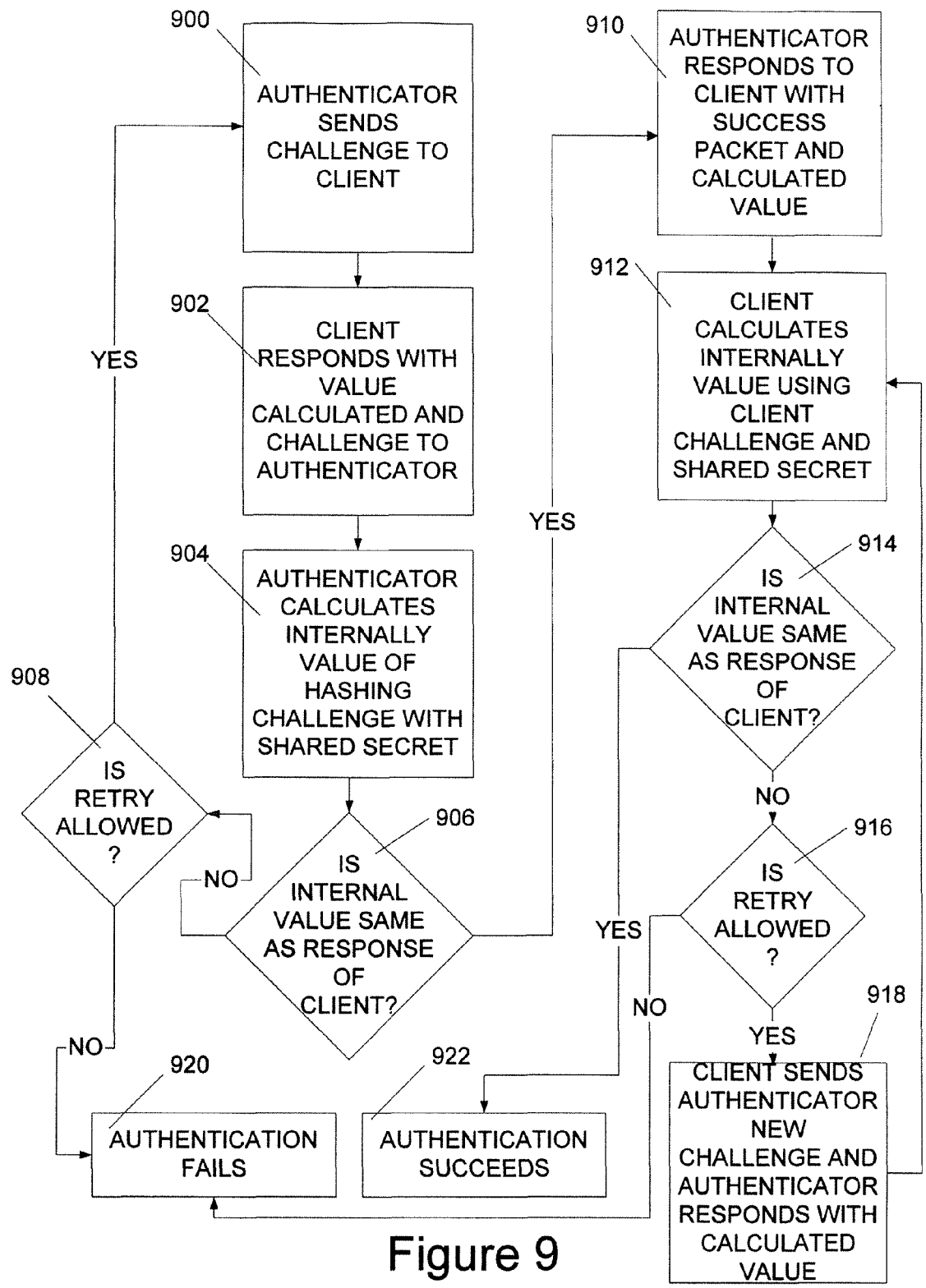
FIG. 9 is a flowchart generally illustrating an authentication mechanism that can be used by the present invention.

Yet another example of a more conventional authentication mechanisms 605 and 607, which can be used within the secure tunnel 601 and 603 of FIG. 6, is the second version of MS-CHAP, known as MS-CHAP V2. Turning to FIG. 9, a flowchart generally illustrating the mechanism by which a client and server are authenticated using MS-CHAP V2 is shown. As will be noted, MS-CHAP V2 is a bi-directional authentication protocol, authenticating the server to the client in addition to authenticating the client to the server. As such, it may be redundant with the TLS protocol described above, since the server can have already authenticated itself to the client as part of the procedure of setting up the secure tunnel. Nevertheless, the use of known, conventional authentication algorithms can provide useful backwards compatibility.

As with the more standard CHAP, PPP can have initially negotiated an authentication requirement and completed the link establishment phase. The authentication begins with the authenticator sending the challenge to the client at step 900. The client then responds with a calculated value and a challenge of its own to the authenticator at step 902. The calculated value could be a hash of the challenge and a password. However, to provide greater security, MS-CHAP V2 also provides for the use of additional inputs into the hash equation, as will be described in more detail below. The authenticator calculates internally the value it expects from the client at step 904, and compares those values at step 906. As before, if the values are different, the authenticator can check whether a retry is allowed at step 908. If a retry is no longer allowed, the authentication fails at step 920.

Should the value sent by the client at step 902 match that calculated by the authenticator at step 904, the client is authenticated. However, because the client replied with a challenge to the authenticator, the authenticator should reply with an appropriate response based on that challenge to authenticate itself. Thus, at step 910, the authenticator not only responds with the authentication of the client, but also with its own response to the client's challenge. At step 912, the client internally calculates the value that it expects from the authenticator, and at step 914 compares these two values. If they are the same, then the authentication succeeds at step 922. Should the response from the authenticator not be the same value as that calculated by the client, and if retries are not allowed at step 916, then the authentication fails at step 920. If retries are allowed, then the client need only send another challenge at step 918. The client does not need to piggyback that challenge onto a response to the authenticator, as the client has already authenticated itself to the authenticator. The authenticator, then, need only respond with the calculated value at step 918, as it has already acknowledged the client's verification. The process can then continue as before. Ultimately either both the client and the authenticator are authenticated to one another and the authentication succeeds at step 922, or one or both of them fail to authenticate themselves and the authentication fails at step 920.

Figure 10:
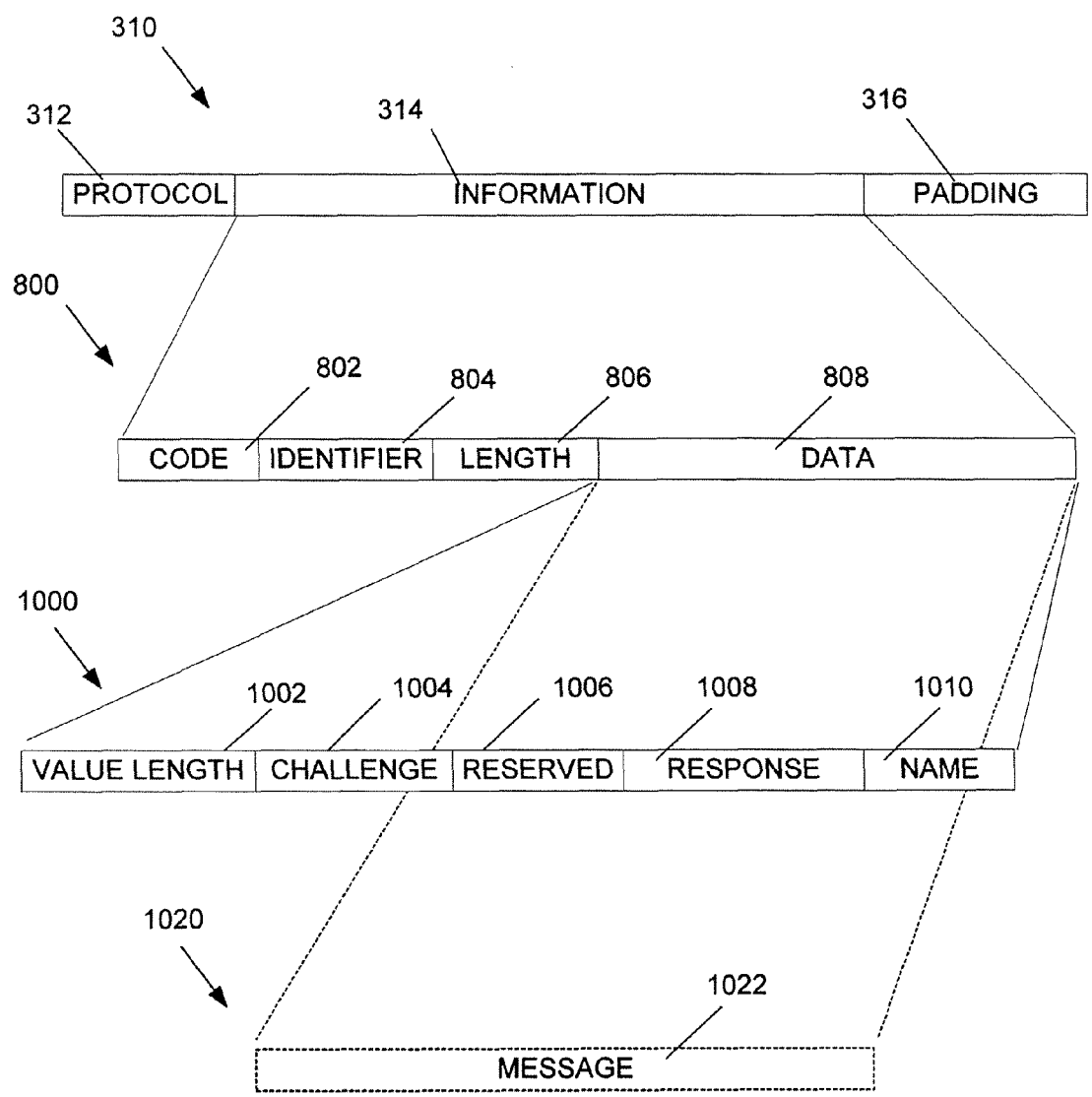
FIG. 10 is a data packet diagram generally illustrating the format of packets that can be used by the present invention.

Because MS-CHAP V2 contemplates a more complex, yet more efficient, authentication, the CHAP packet structure can modified as well. The initial challenge from the authenticator to the client can be formatted as described above with respect to FIG. 8. However, the response packet 1000, carried in the data field 808 of the CHAP packet 800, can be modified to accommodate the piggy-backed challenge in the challenge field 1004, as shown in FIG. 10. The response packet 1000 can also contain a value length field 1002, which indicates the length of the packet 1000. Challenge field 1004 contains the value with which the client challenges the authenticator. Reserved field 1006 can be reserved to provide flexibility, such as flexibility in the size of the challenge. With reserved field 1006, the challenge field 1004 and the reserved field combined can have as many bits as the response field 1008. A computer could thus simply divide the length contained in the value length field 1002 in half and know after which bit the challenge has ended and the response has begun. Without the reserved field 1006, there can be less flexibility in how long the challenge field 1004 can be. The name field 1010 can contain the name of the user seeking to be authenticated. The name could be a login name or the domain name of the user's home directory.

Finally, because the authenticator must somehow respond to the counter-challenge from the client, the success packet 1020 is also slightly modified. As can be seen in FIG. 10, the data field 808 of the CHAP packet 800 can contain a message field 1022 which is the authenticator's response to the client's challenge. The code field 802 can then carry the code which indicates to the client that it has been authenticated.

By sending more conventional authentication communications 605 and 607, show in FIG. 6, through the established secure tunnel 601 and 603, the client's identity can be protected, and the authentication process becomes significantly more secure. For example, the above described conventional authentication mechanisms generally request that a user identification be transmitted as part of the authentication process. However, because this authentication conversation can take place within the secured tunnel, the user can transmit their identity without fear of interception. As already described, the TLS tunnel can be set up without requiring the user's identification, thereby limiting transmission of the user's identity to secure channels.

Protected Authentication Mechanisms Through A Proxy

Network diagram 610 illustrates an embodiment of the present invention which can provide security for the user even when the user is traveling and is forced to connect to their home network through a foreign network that the user may not trust. For example, the foreign network may not implement proper security safeguards, and might allow a rogue interceptor, such as rogue interceptor 230, connected to the foreign network 210, to intercept communications between the user's computing device 212 and the foreign access point 216 or communications between the foreign access point 216 and the foreign authentication server 218, which can travel through the foreign network 210. The present invention allows for the establishment of a secure tunnel 611 and 613, such as the TLS tunnel, whose establishment was described in detail above, between a user computing device 612, such as the user computing devices 212 and 222 shown in FIG. 2, and a foreign authentication server computing device 616, such as the foreign authentication server 218 also shown in FIG. 2. As above, the tunnel 611 and 613 can be established between the user's computing device 612 and the foreign authentication server 616 even through the user may not have an account on the foreign network 210. It is sufficient that the foreign authentication server 612 recognizes the user id provided, which can be an alias, or a domain name, as a user with which it can establish a secure connection.

Once the secure connection, represented by the tunnel 611 and 613 is established, more conventional authentication communication 615 and 617 can take place within the tunnel. As a result of authentication communication 615 and 617, the foreign authentication server 616 may recognize that the user can only be authenticated by the user's home authentication server computing device 618, such as the home authentication server 228 shown in FIG. 2. In such a case, the foreign authentication server 616 can communicate with the home authentication server 618, through a secure protocol such as the RADIUS protocol, and receive the necessary information with which to authentication the user's computing device 612. Alternatively, the foreign authentication server 616 can forward the authentication packets to the home authentication server 618, allowing the home authentication server to authenticate the user's computing device 612. In such a manner, the authentication of the user's computing device remains in the protected tunnel 611 and 613 throughout the foreign network 210. Thus, even if the foreign network 210 had not implemented proper security, the authentication communication 615 and 617 would be protected from the rogue interceptor 230.

Roaming With Protected Authentication Mechanisms

Returning to network diagram 600, the access point 604 can be a wireless access point, such as wireless access points 224 and 225, shown in FIG. 2. In such a case, as the user computing device 602, such as user computing device 222, is carried by the user, it may need to connect to a closer wireless access point with a stronger signal. Thus, in FIG. 2, the user computing device 222 may be handed off from wireless access point 224 to wireless access point 225, resulting in a termination of the connection through wireless access point 224 and the establishment of a new connection through wireless access point 225. In order to avoid the necessity of having to negotiate the secure tunnel 601 and 603 each time the user is transferred between wireless access points, the present invention can take advantage of the ability of certain secure communication protocols, such as TLS, to allow for fast session resumption.

As described above, the TLS protocol allows a client to request that a former TLS session be reestablished. Initially, the authentication server computing device 606 can verify that the user 602 is allowed to request the re-establishment of a former TLS session. For example, users who are more likely to be compromised can be prevented from requesting re-establishment of a former session as a security precaution. The server 606 can also verify that the user 602 is accessing the server 606 through an appropriate access point 604 for the use of session re-establishment. In the wireless example above, the user computing device 602 may need to re-establish a new connection when it is transferred from one wireless access point to another. In such a case, the authentication server computing device 604 can determine that the user computing device 602 is being provided access by an access point 604 that is a wireless access point. The server 606 may be configured to allow session re-establishment in a wireless context because the efficiency benefits described below may outweigh any attendant security risks. However, in a wire-based context, where the client is rarely disconnected from one access point and passed to another, session re-establishment might not be enabled because the benefits are likely to be reduced, while a security risk remains. Thus, if the server 606 determines that that access point 604 granting the user access is a wire-based access point, the server 606 may refuse to re-establish a previously established session, and force the user to perform the complete authentication process described in detail above.

Figure 11:
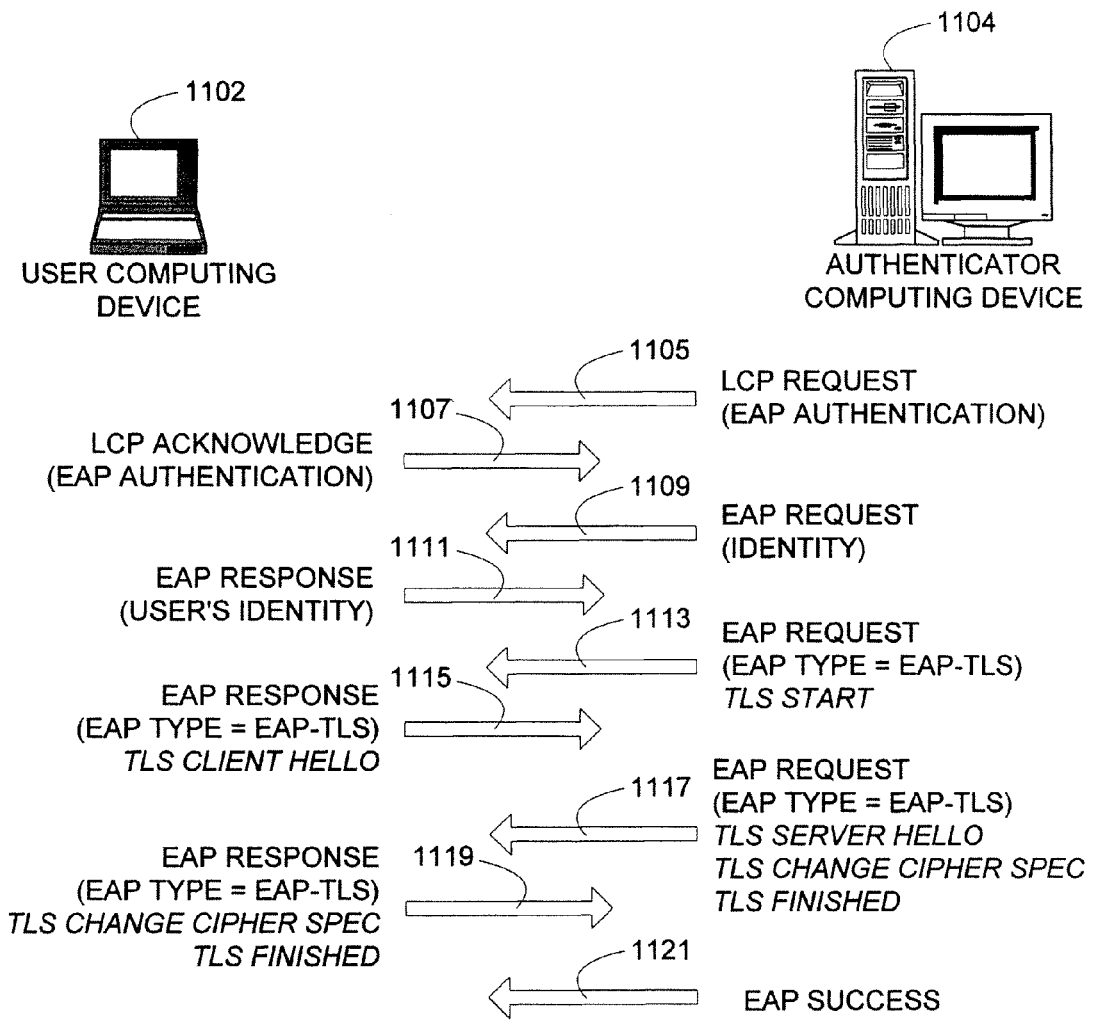
FIG. 11 is a communication flow diagram generally illustrating the flow of messages contemplated by the present invention.

Turning to FIG. 11, a session re-establishment between a user computing device 1102 and an authenticator computing device 1104 is shown. Messages 1105 through 1113 can be identical to message 405 through 413 described above in connection with FIG. 4. However, the client hello message 1115 can differ from message 415 if it contains a session identifier that can be the identifier of a previously established session. In such a case the authenticator 1104 can respond with a resumption message 1117, containing the server hello message described above, in addition to a change cipher specification message, indicating that the server will begin transmitting using the previously negotiated encryption keys and compression algorithm. The first message which the sever 1104 can send using the new read and write states is the TLS finished message. In response, the client 1102 can send an agreement message 1119, similarly containing a change cipher specification message, indicating that the client will begin transmitting using the previously negotiated encryption keys and compression algorithm, and a TLS finished message sent using the new read and write states. Subsequently, the server could respond with an EAP success message 1121, establishing the secure tunnel 601 and 603. Because the authenticator can cache information from previously established secure connections, the secure channel could be set up using less messages and in a shorter amount of time. For a wireless user computing device such as user computing device 222, the shortened amount of time can result in significant increases in efficiency because a mobile user can switch wireless access points many times in the course of a single network connection.

Extensible Protected Authentication Mechanisms

Figure 12:
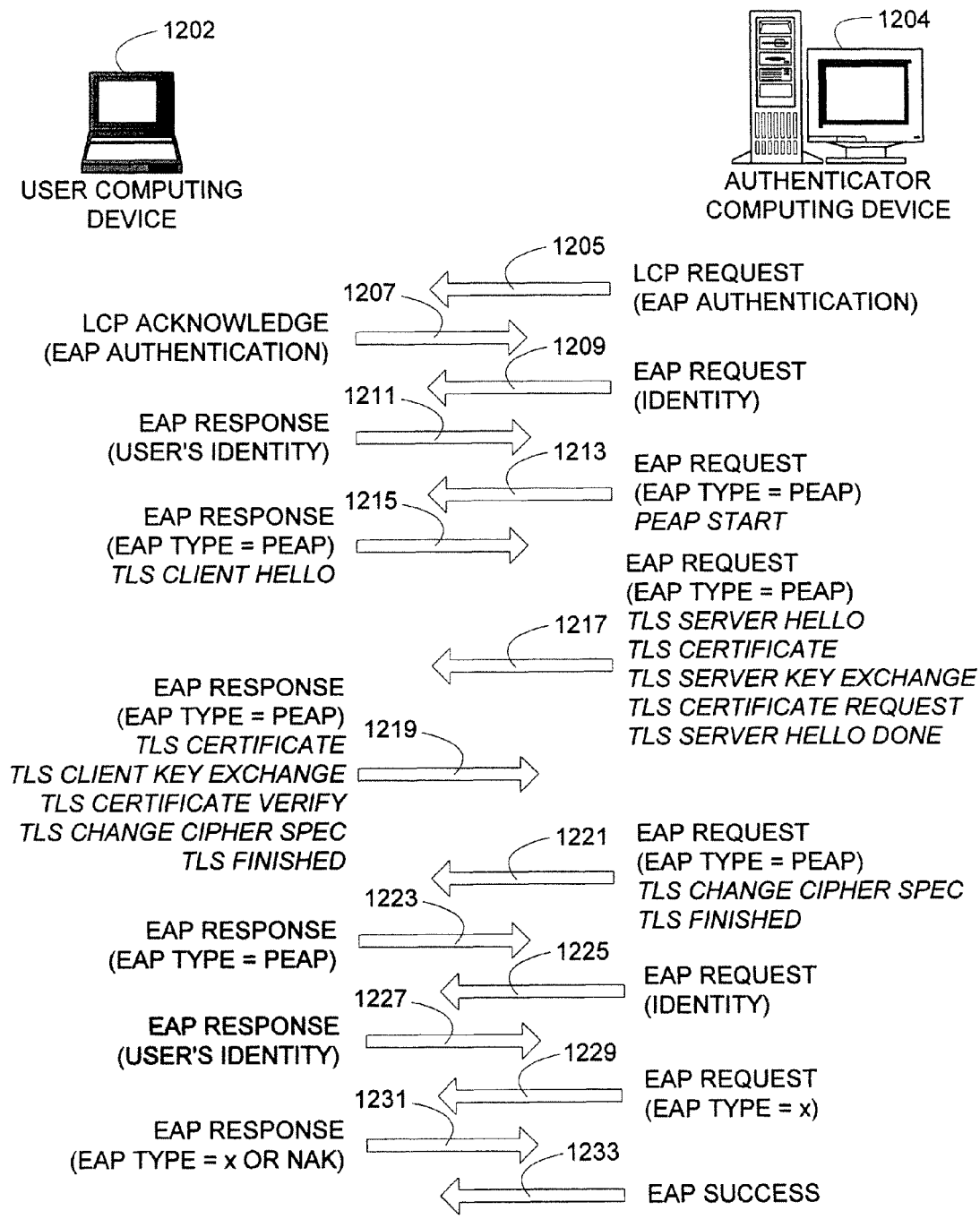
FIG. 12 is a communication flow diagram generally illustrating the flow of messages contemplated by the present invention.

The present invention also contemplates the use of an extensible authentication mechanism, such as EAP, through the secure tunnels 601 and 603. The use of a protected communication protocol, such as TLS, allows EAP to provide protection of negotiation communication and the user's identity, a standardized mechanism for cryptographic key exchange, support for fragmentation and reassembly of a message across multiple packets, and the ability to provide a fast reconnection, such as that described above. Turning to FIG. 12, negotiation communication for a protected EAP (PEAP) authentication mechanism is shown. While communications 1205 through 1223 appear identical to their counterparts 405 through 423 in FIG. 4, differences can exist, as will be described below.

A user computing device 1202 can negotiate PEAP authentication with an authenticator computing device 1204 through the use of LCP, as shown in FIG. 12. The authenticator 1204 can begin by sending an LCP request 1205 requesting the use of EAP as the authentication protocol. The client 1202 can agree to the use of EAP with an LCP acknowledgement packet 1207. The server can then send an EAP request 1209 for the user's identity. As discussed above, the EAP response 1211 will be sent in the clear and, for security reasons, may not contain the same user identification that will be used with message 1227, which is encrypted. Nevertheless, the EAP response 1211 can contain an identity that will allow the authenticator 1204 to determine whether it can proceed to establish a secure communication channel with the client 1202. If the server determines it can continue, or if it finds an appropriate authenticator to which it can forward the necessary packets, it can respond with an EAP request 1213 containing a PEAP start message indicating the beginning of PEAP conversation.

The client can encapsulate, within an EAP response packet 1215, a TLS client hello listing available options, as described above. In addition, the client hello can have a TLS version number to aid in compatibility. If the server cannot support a sufficiently high TLS version to accommodate the protocol, a different authentication mechanism can be used. In response, the server can send message 1217, containing a server hello message, and other messages described above in connection with message 417. As described above, the client may wish to authenticate itself within the secure channel established once the TLS negotiation is completed. In such a case, either the server 1204 should not request a client certificate in message 1217, or the client 1202 should ignore the request when responding with message 1219. In either case, another EAP request for the client's identity, followed by EAP packets agreeing on an authentication protocol to authenticate the client may need to be sent after the TLS tunnel is established, as indicated by messages 1225 through 1233 in FIG. 12. However, the client 1202 can also authenticate itself within the context of the TLS negotiation by including a TLS client certificate in the client finishing message 1219. In addition to the TLS client certification, the client finishing message 1219 can also contain the messages described above in connection to message 419.

Once the client 1202 has indicated that it is switching to the negotiated cryptographic mechanism, by using the TLS change cipher spec message and the TLS message of the client finishing message 1219, the server can respond with a server finishing message 1221 that similarly indicates the server is switching to the negotiated cryptographic mechanism. Subsequently, in order to complete the EAP request and response cycle, the client can send an EAP response message 1223. In this manner, the client can also verify that server has correctly negotiated and implemented the cryptographic and compression mechanisms. Once the client 1202 responds with message 1223, the secure TLS tunnel can be established, and all further communication is encrypted.

Thus, a further possibility for client authentication is that the client 1202 can postpone sending the TLS client certificate until after message 1222. In such a case, the server 1204 can send another TLS server hello message after message 1223, allowing the client the option of using a TLS client certificate to authenticate itself. This can allow the client certificate to be sent in the encrypted channel. Alternatively, the client can respond with a no negotiation alert, indicating that the client wishes to proceed with the EAP negotiation, illustrated in FIG. 12 starting with message 1225.

With message 1225, the server 1204 can begin another EAP negotiation to determine an appropriate authentication mechanism for the client 1202 if the client has not already successfully authenticated itself. However, this EAP negotiation can occur within the established TLS tunnel, and can, therefore, be protected. In response to the EAP request 1225, the client can send an EAP response 1227, providing the user's identity. The server 1204 can then continue with EAP authentication negotiation by suggesting a particular authentication mechanism in EAP request 1229 (denoted by the variable "x" in FIG. 12). The client 1202, with response 1231, can choose to accept the authentication mechanism proposed by the server in EAP request 1229, or it can reject it. If the client rejects the proposed authentication mechanism, the server can propose another authentication mechanism, and continue doing so until the client accepts one or the server exhausts all of the authentication mechanisms it supports. If the client accepts the proposed authentication mechanism, the server can respond with an EAP success message 1233, and the client authentication can then proceed according to the particular authentication mechanism selected by the client and server.

The present invention contemplates the use of multiple extensible authentication protocol negotiations, such as multiple EAP negotiations, occurring within the established secure tunnel. For example, EAP can be used to negotiate an authentication mechanism, and authenticate, both the human user and the user computing device 1202. If both the user computing device 1202 and the human user are authenticated, the human user can, through the user computing device 1202 obtain full access to the protected network. However, if the user computing device 1202 is not properly authenticated, the human user may be restricted to network domains having reduced security requirements. For example, a kiosk computing device can be installed in public locations on a corporate campus. Normally such a kiosk computing device is exclusively authenticated using machine credentials. Since users using the kiosk computing devices are generally going to be visitors, they may not have valid user credentials and accounts on the corporate network. Computing devices such as the kiosk can, therefore, be allowed limited access to the corporate network resources and are often provided only public internet access. In cases where the authentication is limited to the computing device only, such as in kiosks computing devices, they are more susceptible to a security breach and hence even an employee with valid user credentials may be limited to checking their email, but denied access to file servers containing sensitive corporate documents. Alternatively, a user computing device 1202 may be properly set up within an office on a corporate campus. Such a computing device may be less susceptible to a security breach because, for example, it is kept in an office in a restricted building and may, therefore, be authenticated. In such a case, a human user that can present the proper credentials to be authenticated can be given unrestricted access to the network through such a user computing device.

As described above, a human user can be authenticated through the use of user credentials, such as a password-based shared secret, that the user must prove knowledge of. A user computing device can be similarly authenticated, or, if it is sufficient to know only the domain of the user computing device, the user computing device can be authenticated through the use of its machine credentials that can be referenced in a central store, such as an Active Directory. Thus, in the examples above, the kiosk user computing device will appear in a domain which indicates a high security risk access through the kiosk user computing device may be restricted even though the kiosk is properly authenticated. Conversely, the user computing device set up in an office on the corporate campus may be part of a domain that indicates a low security risk and access to the corporate network resources may be less restrictive. Nevertheless, the present invention contemplates that the human user of such a machine may still be required to authenticate themselves, and the ultimate access granted to the human user may depend on both the successful authentication of the user computing device and the human user attempting to gain access through the user computing device.

Figure 13:
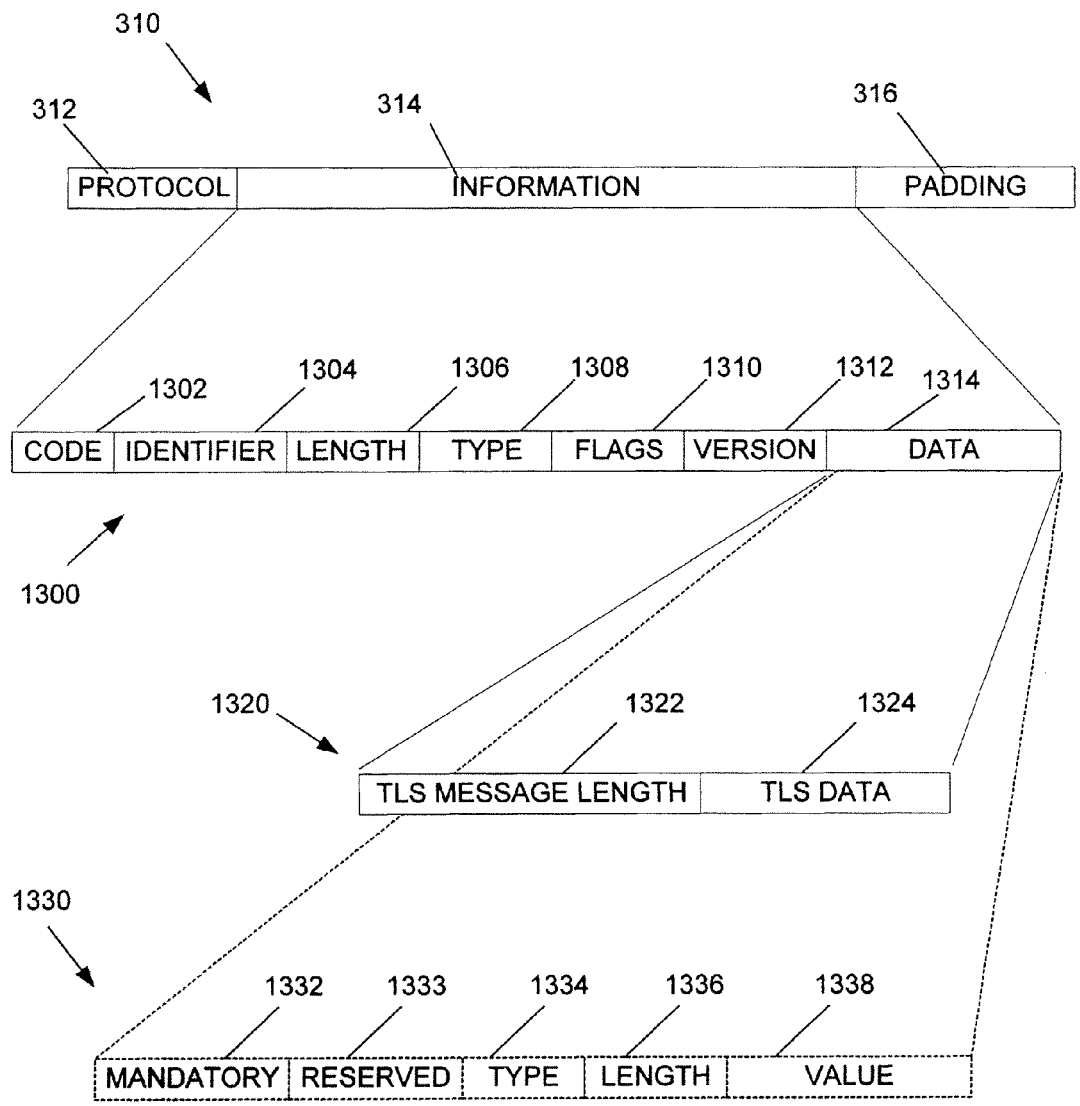
FIG. 13 is a data packet diagram generally illustrating the format of packets that can be used by the present invention.

Turning to FIG. 13, a packet structure contemplated by the present invention for PEAP is shown. The PEAP packet 1300 can be carried in the information field 314 of PPP packet 300. The PEAP packet 1300 can contain a code field 1302, which can indicate whether the packet is a request or a response to a request, an identifier field 1304, which can identify which response is a response to a particular request, a length field 1306, which contains the length of the PEAP packet 1300, a type field 1308, which can specify that the packet is a PEAP packet, a flags field 1310, a version field 1312, and a data field 1314. The flags field 1310 can contain a number of flags to indicate certain conditions, such as whether the message was fragmented, the total length of the message, and whether additional fragments follow the current fragment. The version field 1312 can contain the PEAP version in order to enable PEAP to be backwards compatible. When attempting to negotiate the PEAP protocol, the client 1202 and the server 1204 should attempt to negotiate the highest version of PEAP that they commonly support. Thus, if the client does not support the PEAP version suggested by the server, it can provide the highest version it does support in the version field of the response packet. The data field 1314 can contain a request or response packet 1320, comprising a TLS message length field 1322, and a TLS data field 1324, that can carry the TLS data described above in connection with FIGS. 4 and 12.

The encryption and decryption keys used in the TLS negotiation should not be used in other contexts, and a new set of cryptographic keys can be derived from the TLS master secret, for use in the link layer encryption algorithms. Since authentication methods may not know which link layer encryption algorithms have been negotiated, it may not be possible for the authentication methods ultimately chosen by PEAP to provide link layer cryptographic keys. The present invention contemplates the derivation of master session keys which can be truncated as needed to be used by the authentication methods. As described above in connection with FIG. 4, the TLS authentication derives a master session key at the client and server. This key can be used to derive master session keys that are larger than necessary to allow for truncation. The master session keys can include encryption and decryption keys, authentication keys, and initialization vectors.

One method for deriving the master session keys can use the keys derived by the TLS authentication in the manner described above, as an input into a pseudorandom function. In addition, a random value, such as the value obtained by concatenating the random values sent by the client and the server in the client hello and server hello messages described above, can also be input in to the pseudorandom function. Similarly, a string, such as "client PEAP encryption" can also be provided as an input to the pseudorandom function. The output of the pseudorandom function can be computed to a desired length, such as 128 bytes. A second value can be obtained by providing, as input to the pseudorandom function, an empty string, the string "client PEAP encryption", and the random value described above. The output of this pseudorandom function can be computed to a desired length, such as 64 bytes. A client master session encryption key can then be obtained by truncating, to the desired length, the first 32 bytes of the 128 byte value calculated using the pseudorandom function. Similarly, a server master session encryption key can be obtained by truncating, to the desired length, the second 32 bytes of the 128 byte value. Client and server master session authentication keys can be obtained by truncating, to the desired length, the third and fourth 32 bytes of the 128 byte value, respectively. Client and server master session initialization vectors can be obtained by truncating, to the cipher's block size, the first and second 32 bytes of the 64 byte value obtained above from the pseudorandom function. As will be known by those skilled in the art, more secure keys can be derived by increasing the length to which the pseudorandom functions are calculated, and truncating a longer segment to derive the various master session keys. Once derived, these master session keys can then be provided to the negotiated authentication mechanism.

The present invention contemplates that extensions can be provided to the PEAP mechanism described above, to allow for greater and more accurate communication between the user computing device and the authentication server computing device. Returning to FIG. 13, packet 1330 illustrates an alternative structure of the data field 1314 that can contain name/value pairs for transmitting information to and from the user computing device and the server computing device. Packet 1330 contains a mandatory indicator field 1332 that can specify whether the information specified by the name/value pair is mandatory, a reserved field 1333, a type field 1334 that can specify the name or nature of the information in the name/value pair, a length field 1336 that contains the length of the attribute, including the type, length and value fields, and a value field 1338 that contains the value of the name/value pair.

Because of the extensible nature of a name/value pair, packet 1330 can be used to convey information between the client 1202 and the server 1204. For example, as will be described in detail below, the client 1202 can request that a previously negotiated PEAP session be re-established, which can provide efficiencies because the complete negotiation process described above in connection with FIG. 12 is not repeated. Packet 1330 can be used by the client 1202 to provide relevant information to the server 1204 to allow the server 1204 to determine whether the client should be allowed to request session re-establishment. As will be explained below, certain client configurations, such as a wireless client, may be allowed to request re-establishment. Thus, packet 1330 can be used by the client 1202 to indicate to the server 1204 that it is accessing the network through a wireless connection. Similarly, packet 1330 can be used by the server 1204 to provide human-readable text to the client 1202 explaining why the client's requests, such as a request to re-establish a session, are being rejected. In such a manner the human user of client 1202 can more easily and more accurately correct the problem and achieve a successful authentication.

Roaming With Extensible Protected Authentication Mechanisms

Because the PEAP mechanism seeks to combine the negotiation of a secure tunnel with an extensible authentication protocol, further efficiencies can be realized when seeking to reestablish a previously negotiated connection. As explained in detail above, an authentication server can determine whether the user is allowed to request re-establishment of a previous session and the authentication server can determine whether the user is connecting through an appropriate access point for session re-establishment. Such a determination can be aided through the use of the name/value pairs which can be transmitted using the extensions to PEAP described above. If each of these criteria are met, the authentication server can allow the user to re-establish a session.

Figure 14:
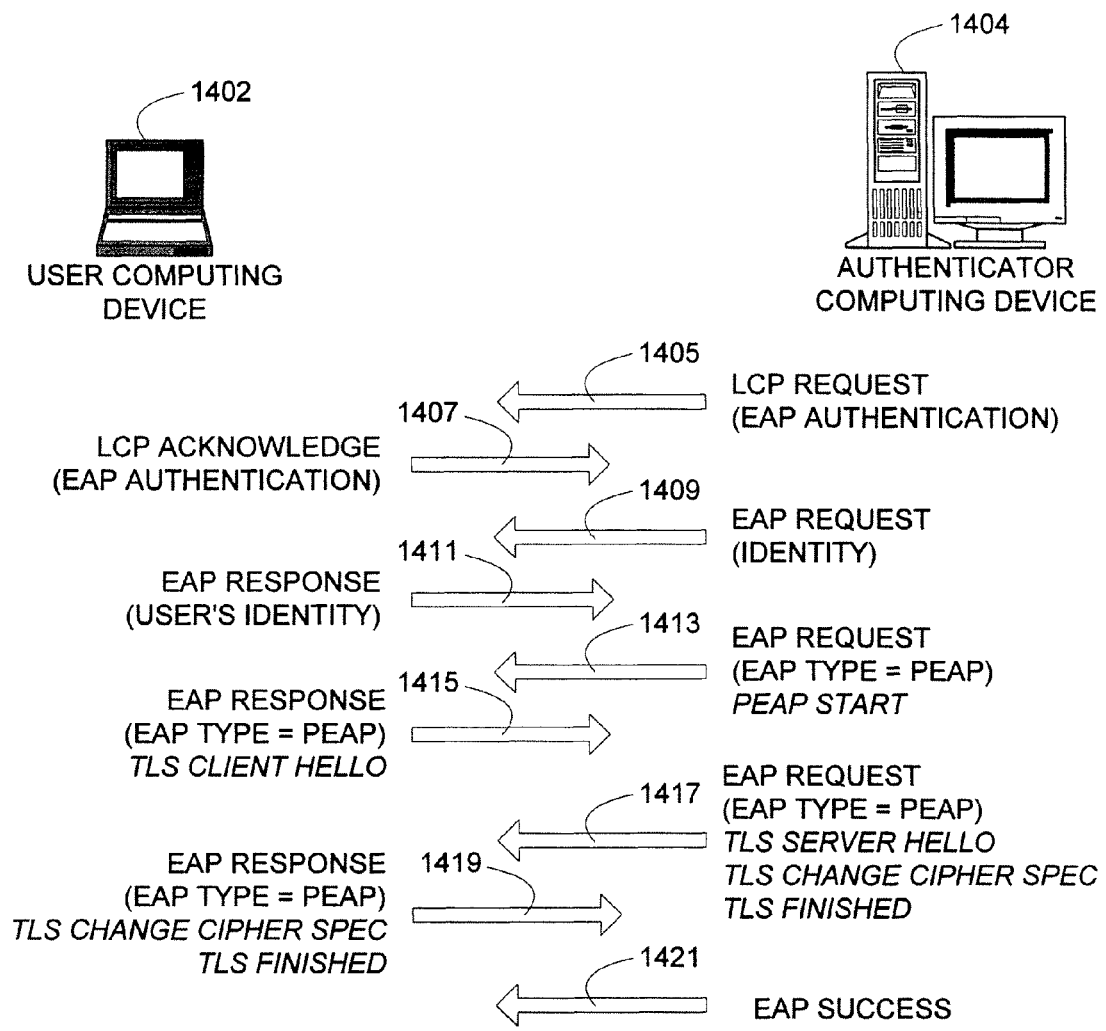
FIG. 14 is a communication flow diagram generally illustrating the flow of messages contemplated by the present invention.

Turning to FIG. 14, an abbreviated negotiation is shown, with the client 1402 reestablishing a PEAP connection to the server 1404. Messages 1405 through 1413 are analogous to messages 1205 through 1213, described, above, and allow the client and the server to negotiate the use of PEAP as an authentication mechanism. When the client responds, with message 1415, to the server's request 1413 to start PEAP, the TLS client hello can contain a session identifier of a previously negotiated session. As before, if the server caches information regarding previously negotiated sessions, such as the session identifier, and the cryptographic keys, it can reference the session identifier provided in the client hello in message 1415 and resume the previously negotiated session based on the cached information. To resume the session, the server 1404 can send a resumption message 1417, comprising a server hello message containing information regarding the selected encryption and compression algorithms, a change cipher specification message, indicating that the server will implement the previously negotiated TLS read and write states, and a TLS finished message sent using the new TLS read and write states. The client 1402 can then respond with response message 1419, containing its own change cipher specification message, indicating that it will implement the previously negotiated TLS read and write states, and a TLS finished message sent using the new TLS read and write states. The server can then respond with an EAP success message 1421. As above, the caching of information regarding previously negotiated sessions allows the client and the server to reestablish the previously negotiated session more efficiently with a smaller number of messages and fewer computationally intensive tasks.

However, because PEAP can be a unified authentication mechanism, by which: a secure channel is established, EAP communication within the secure channel selects a particular authentication mechanism for the client, and the client is authenticated using that mechanism; additional efficiencies can be realized using the procedure of FIG. 14. Specifically, the server 1404 can only cache those sessions which, not only established a secure tunnel, but also selected an appropriate authentication mechanism for the client 1402, and successfully authenticated the client. In such a case, the cached sessions are only those sessions that were established with valid clients. The server 1404 can cache a PEAP user identifier, which can be used to identify the user when requesting a re-connection, a TLS handle, obtained as a result of the negotiation of the secure channel, a list of all of the authentication methods that were successfully selected using the extensible authentication protocol, the information returned by the successful selection of authentication methods, and the information returned by the successful authentication of the client. The session identifier described above in connection with message 1415 can be the PEAP user identifier, and message 1415 can also contain the authentication mechanism selected using the extensible authentication protocol during the initial session establishment. The server 1404 can verify the PEAP user identifier, and determine that the authentication mechanism sent by the client in message 1415 comports with the server's cache. Then, as described above, the server can proceed to issue a change cipher spec message indicating the re-establishment of a cached session.

Because of the unified nature of the PEAP mechanism, when the server sends the success message 1421, no additional authentication on the part of the client needs to be required. Thus, the success message 1421, not only establishes a secure channel, but simultaneously provides the client with access to the network. By avoiding having to re-authenticate itself, the client can realize significant efficiencies in environments such as a wireless network, where the client may be forced to reestablish the session many times due to handoffs or network interruptions. As a result, the user can be provided with a more efficient, yet more secure, authentication mechanism.

Extensible Protected Authentication Mechanisms Through A Proxy

Returning to FIG. 6, PEAP can be used to establish the secure tunnel 601 and 603 shown in network diagram 600, and can select the appropriate mechanism for authenticating the user computing device 602 with communications 605 and 607. As above, if the secure channel 601 and 603 is established with the authentication server computing device 606, then the cryptographic keys may need to be sent to the access point 604 to encrypt and decrypt network communications after the authenticator has completed its responsibilities, and no longer communicates with the user computing device 602. PEAP can also be used to establish the secure tunnel 611 and 613 of network diagram 610 and select the appropriate mechanism for authenticating the user computing device 612 with the home authentication server computing device 618 through communications 615, 617, and 619.

The secure tunnels 611 and 613 can be thought of as one contiguous tunnel in which secure communications 615 and 617 are forwarded to and from the user 612 and the foreign server 616 without any understanding on the part of the access point 614. Alternatively, the secure tunnels 611 and 613 can be independently established between user 612 and access point 614 and again between access point 614 and foreign server 616. In either case, the user's authentication communications are protected until they reach foreign server 616. However, with the latter possibility, the access point 614 has access to the authentication communication 615 and 617 because it is the endpoint of secure tunnel 611 and it, therefore, has the necessary decryption keys to decrypt and gain access to the communications 615 carried within tunnel 611. If the user 612 does not trust the access point 614, then it is preferable that secure tunnels 611 and 613 are contiguous. In such a case, the access point 614 does not have access to the authentication communications 615 and 617 because they are within the secure tunnel 611 and 613 and the access point 614 merely forwards along the encrypted packets representing the communications 615 and 617 within the secure tunnel 611 and 613. The access point 614 does not have the necessary keys to decipher the encrypted packets it forwards along.

However, once the user 612 has been authenticated, the foreign authentication server 616 and the home authentication server 618 no longer need to communicate with the user. The user 612 receives its network access through the foreign access point 614. However, because the access point 614 was not an endpoint of the authentication communication, it may not have the master sessions keys resulting from that authentication, which may be needed to encrypt communication between the user and the access point. Such master session keys can be obtained through truncation of keys derived from the establishment of the secure tunnel, in the manner described above. The master session keys can then be communicated from the computing device at which they were derived, such as the foreign server 616 or the home server 618 to the foreign access point 614. Alternatively, the truncation described above can be performed at the access point 614 after it receives the keys derived from the establishment of the secure tunnel from server 616 or 618. In either case, the keys were not sent until the completion of the user's authentication, and the user's identity and authentication information were protected from the access point 614.

Because PEAP can be a two part mechanism, the first part of the PEAP mechanism, the establishment of a secure tunnel, can be performed by one server, such as the foreign authentication server computing device 616, and the second part of the PEAP mechanism, the client authentication, can be preformed by another server, such as the home authentication server computing device 618. In the situation illustrated by network diagram 610, it is likely that the user computing device 612 has no pre-existing trust relationship with either the foreign access point 614 or the foreign authentication server computing device 616. Thus, the user 612 only trusts the home authentication server computing device 618 and seeks to be authenticated by server 618. The foreign server 616, because it is not the user's home authentication server, can rely on the home server 618 to provide the necessary information to authenticate the user 612. The foreign server 616 can simply forward the communications 617, in the form of communications 619, onto the home server 618 or the foreign server can rely on a remote authentication protocol, such as the RADIUS protocol described above, to request, using communications 619, that the home server 618 provide the necessary authentication information. By establishing a connection between the home server 618 and the foreign server 616, the user 612 can implicitly trust the foreign server 616 because the home server 618 trusts it. Thus, the user 612 can rely that the home server 618 properly determined that the foreign server 616 was trustworthy. Alternatively, the home server 618 can send an explicit trust message to the user 612, allowing the user 612 to trust the foreign server 616. Once the user trusts the foreign server, mechanisms such as the fast session re-establishment described above can be performed between the foreign server 616 and the user 612, eliminating the need to include another layer of communication to the home authentication server 618, and increasing efficiency.

Network diagram 620 illustrates another possibility contemplated by the present invention for authenticating a client that seeks to access a home network through a foreign network. Network diagram 620 illustrates a user computing device 622, such as user computing device 212 or 222, communicating through a foreign access point 624, such as foreign access point 216, to a foreign authentication server computing device 626, such as the foreign authentication server 218, and to a home authentication server computing device 628, such as the home authentication server 228. An initial PEAP session can be created between the user computing device 622 and the foreign authentication server computing device 626, establishing secure tunnels 633 and 635. Alternatively, the initial PEAP session can be independently established between the user 622 and the access point 624 and between the access point 624 and the foreign authentication server 626. Such an initial PEAP session can be established through the use of an domain-only user identification or similar alias that is sufficient to allow the foreign server 626 to determine that the user 622 is allowed to establish the PEAP session 633 and 635.

Subsequently, another PEAP session can be created between the client 622 and the home authentication server computing device 628, by having the foreign server 626 pass along to the home server 628 the PEAP packets from this second session. Such a second PEAP session would create the secure tunnel 621, 623, and 625. Conceptually, the secure tunnels 627 and 629 created by the second PEAP session would be within the secure tunnels 612 and 623 established by the first PEAP session. These secure tunnels could then protect client authentication communication 627, 629, and 631 between the client 622 and the home server 628. By encapsulating PEAP within PEAP each connection to the foreign server 626 and the home server 628 can be treated independently. This can be particularly useful if the foreign server 626 and the home server 628 are managed by two separate and independent network management departments. Thus, the second PEAP tunnel 621, 623, and 625 can be maintained while the first PEAP tunnel 633, 635 can be re-established when the user 622 roams, such as in a wireless network, to a different access point 624, using the fast connection re-establishment described in detail above. Additionally, the second PEAP tunnel 621, 623, and 625 protects user authentication communications all the way to the home authenticating server 628, which might be the only device in the chain illustrated by network configuration 620 that the user 622 trusts. Because the user authentication communications 627, 629, and 631 are wholly contained within the PEAP tunnel 621, 623, and 625, which does not terminate until the home server 628, the authentication communications 627, 629, and 631 cannot be accessed by any of the intermediate devices, including foreign access point 624 and foreign server 626. They are, therefore, secure until they reach the home server 628, which is a trusted device. Additional information regarding the PEAP mechanism can be found in the Internet Engineering Task Force working draft entitled "Protected EAP Protocol" by Andersson, Josefsson, Zom, Simon, and Palekar, dated Feb. 23, 2002, the contents of which are hereby incorporated by reference in their entirety.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Similarly, while specific, industry standard protocols have been used in the description, the present invention is equally applicable to any protocols providing similar benefits as those described herein, and is not meant to be limited to the particular embodiments described in detail above. Therefore, the invention as described herein contemplates all such embodiments as may come within the scope of the following claims and equivalents thereof.

We claim:

1. A method of authenticating a mobile user to a wireless network using a Transport Layer Security (TLS) tunneling protocol, the method comprising:
   receiving at a client from a server a request to use a protected extensible authentication protocol for authentication;
   sending by the client afirst response packet formatted according to the TLS tunneling protocol and the protected extensible authentication protocol to the server, the first response packet providing a user alias to protect the user's identity and for establishing a secure communication tunnel, the first response packet including a session identifier identifying a previous authentication session including a previous user authentication by the server;
   receiving a second request packet from the with server information for establishing the secure communication tunnel, wherein the second request packet includes information for authenticating the server to the client;
   transmitting a second response packet to the server, wherein the second response packet establishes the secure communication tunnel;
   receiving a success packet from the server, the success packet proposing a fast reconnect wherein the fast reconnect uses the previous user authentication to allow the wireless connection to quickly resume services when the mobile user is roaming and connecting to different wireless access points;
   transmitting a success response packet agreeing to the fast reconnect; and
   after successful fast reconnect, encrypting subsequent communications using stored keys.

2. The method of claim 1, wherein the steps are performed through a wireless connection.

3. The method of claim 1, further comprising the use of a transport layer security protocol for establishing the secure communication tunnel.

4. The method of claim 1, further comprising:
   receiving a request from the server for an initial client identity; and
   transmitting a portion of a user identification in response to the request for an initial client identity.

5. The method of claim 1, further comprising
   receiving a request from the server for an initial client identity; and
   transmitting the user alias in response to the request for an initial client identity.

6. The method of claim 1, wherein the server uses the session identifier to identify the client and retrieve cached information regarding the previous user authentication.

7. The method of claim 1, further comprising:
   after the receiving the request to use a protected extensible authentication protocol for authentication from the server, transmitting a set of possible cryptographic mechanisms to the server;
   receiving from the server, a selected cryptographic mechanism from the set of possible cryptographic mechanisms;
   deriving cryptographic keys for the selected cryptographic mechanism; and implementing the selected cryptographic mechanism with the derived cryptographic keys.

8. A method of authenticating a mobile user to a wireless network using a Transport Layer Security (TLS) tunneling protocol, the method comprising:
   transmitting by a server a request to a client to use a protected extensible authentication protocol for authentication;
   receiving a first response packet formatted according to the TLS tunneling protocol and the protected extensible authentication protocol, the first response packet including a user alias to protect the user's identity and for establishing a secure communication tunnel and including a session identifier identifying a previous authentication session and a previous user authentication;
   transmitting a second request packet to the client with server information for establishing a secure communication tunnel, wherein the second request packet includes information for authenticating the server to the client;
   receiving a second response packet from the client, wherein the second response packet establishes the secure communication tunnel;
       transmitting a success packet to the client, the success packet proposing a fast reconnect wherein the fast reconnect uses the previous user authentication to allow the wireless connection to quickly resume services when the mobile user is roaming and connecting to different wireless access points;
       receiving from the client a success response packet agreeing to the fast Reconnect; and
       after successful fast reconnect, encrypting subsequent communications using stored keys.

9. The method of claim 8, wherein the steps are performed through a wireless connection.

10. The method of claim 8, further comprising the use of a transport layer security protocol for establishing the secure communication tunnel.

11. The method of claim 8, further comprising:
   transmitting a request to the client for an initial client identity; and
   receiving a portion of a user identification in response to the request for an initial client identity.

12. The method of claim 8, further comprising:
   transmitting a request to the client for an initial client identity; and
   receiving the user alias in response to the request for an initial client identity.

13. The method of claim 8, further comprising:
   using the session identifier to identity, the client and retrieve cached information regarding the previous user authentication.

14. The method of claim 8, further comprising:
   after the transmitting the request to use a protected extensible authentication protocol for authentication to the client, receiving a set of possible cryptographic mechanisms from the client; and
   transmitting to the client, a selected cryptographic mechanism from the set of possible cryptographic mechanisms.

15. A system for authenticating a user of authentication, the system comprising:
   one or more processors configured to execute computer readable instructions; and
   one or more computer storage media storing computer executable instructions that when executed by the one or more processors perform a method comprising:
       transmitting a request to a client to use a protected extensible authentication protocol for authentication;

receiving a first response packet formatted according to the protected extensible authentication protocol, the first response packet including client information for establishing a secure communication tunnel and including a session identifier identifying a previous secure communication tunnel and a previous user authentication established for a user at the client;

transmitting a second request packet to the client with server information for establishing a secure communication tunnel, wherein the second request packet includes information for authenticating the server to the client;

receiving a second response packet from the client, wherein the second response packet establishes the secure communication tunnel;

transmitting a success packet to the client, the success packet proposing a fast reconnect, wherein the fast reconnect uses the previous user authentication; and receiving from the client a success response packet agreeing to the fast reconnect.

16. The system of claim 15, wherein the one or more computer storage media store additional instructions that when executed perform the steps of:

transmitting a request to the client for an initial client identity;

receiving a user alias in response to the request for an initial client identity.

* * * * *